United States Patent
Nam

(10) Patent No.: US 11,804,773 B2
(45) Date of Patent: Oct. 31, 2023

(54) DEAD TIME CONTROLLER AND DC-DC CONVERTER INCLUDING THE SAME

(71) Applicant: Samsung Electronics Co., Ltd., Suwon-si (KR)

(72) Inventor: Hyunseok Nam, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 17/519,517

(22) Filed: Nov. 4, 2021

(65) Prior Publication Data
US 2022/0286043 A1 Sep. 8, 2022

(30) Foreign Application Priority Data

Mar. 3, 2021 (KR) .................. 10-2021-0027985

(51) Int. Cl.
*H02M 3/158* (2006.01)
*H02M 1/38* (2007.01)
*H02M 3/157* (2006.01)

(52) U.S. Cl.
CPC ........... *H02M 1/385* (2021.05); *H02M 3/157* (2013.01); *H02M 3/158* (2013.01)

(58) Field of Classification Search
CPC .............................................. H02M 1/38–385
See application file for complete search history.

(56) References Cited

U.S. PATENT DOCUMENTS

| | | | |
|---|---|---|---|
| 7,868,597 B2 | 1/2011 | Dequina | |
| 8,847,677 B2 | 9/2014 | Nagashima | |
| 9,621,039 B2 | 4/2017 | Yamada | |
| 10,224,831 B1 | 3/2019 | Hurtado et al. | |
| 10,666,131 B2 | 5/2020 | Konishi et al. | |
| 10,763,743 B1 | 9/2020 | Zuccollo | |
| 10,770,969 B2 | 9/2020 | Peretz | |
| 2006/0152204 A1* | 7/2006 | Maksimovic | H02M 3/1588 323/284 |
| 2006/0208716 A1* | 9/2006 | Chapuis | H02M 3/1588 323/283 |
| 2013/0187715 A1* | 7/2013 | Nagashima | H03F 3/45475 330/252 |

* cited by examiner

*Primary Examiner* — Peter M Novak
(74) *Attorney, Agent, or Firm* — Muir Patent Law, PLLC

(57) ABSTRACT

A dead time controller includes a phase detector, a filter circuit and an amplifying circuit. The phase detector generates a detection signal by detecting a phase difference between a first driving control signal applied to a first power transistor and a second driving control signal applied to a second power transistor, the detection signal being associated with a dead time corresponding to an overlapped deactivation interval between the first and second driving control signals. The filter circuit generates a DC voltage signal by filtering and averaging the detection signal based on a pulse-width modulation (PWM) signal. The PWM signal is generated by performing a PWM on an output voltage provided at an output node coupled to a second terminal of the inductor. The amplifying circuit generates an amplified voltage signal having a voltage level proportional to the dead time by amplifying the DC voltage signal.

16 Claims, 20 Drawing Sheets

DEAD TIME CONTROLLER AND DC-DC CONVERTER INCLUDING THE SAME

CROSS-REFERENCE TO RELATED APPLICATION(S)

This U.S. non-provisional application claims priority under 35 USC § 119 to Korean Patent Application No. 10-2021-0027985, filed on Mar. 3, 2021, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a dead time controller and a DC-DC converter including the dead time controller.

2. Discussion of the Related Art

A voltage converter, for example, buck converter, which converts a relatively high direct current (DC) voltage to a relatively low DC voltage, is typically employed to provide power to electronic devices. The voltage converter may be included in various devices and systems such as mobile devices, electric motor vehicles, etc.

The voltage converter may need high performance and high efficiency. The voltage converter may provide a power supply voltage to an internal system of a mobile device. The voltage converter may include a buck converter to step down a voltage level, a boost converter to step-up a voltage level and a buck-boot converter to step down or step up a voltage level. For example, when the voltage converter charges various batteries in the mobile devices, the voltage converter should convert a high DC voltage to a low DC voltage with high efficiency. It is desired that a dead time of signals in the voltage converter may be controlled to have small amount of time especially at high frequency such that the voltage converter may increase efficiency.

SUMMARY

Some example embodiments provide a dead time controller in a DC-DC converter, capable of securing reliability of operation of a power transistor.

Some example embodiments provide a DC-DC converter including a dead time controller capable of securing reliability of operation of a power transistor.

According to example embodiments, a dead time controller in a DC-DC converter includes a phase detector, a filter circuit and an amplifying circuit. The phase detector generates a detection signal by detecting a phase difference between a first driving control signal applied to a first power transistor configured to pull-up a switching node coupled to a first terminal of an inductor included in the DC-DC converter and a second driving control signal applied to a second power transistor configured to pull-down the switching node, the detection signal being associated with a dead time corresponding to an overlapped deactivation interval between the first driving control signal and the second driving control signal. The filter circuit generates a DC voltage signal by filtering and averaging the detection signal based on a pulse-width modulation (PWM) signal. The PWM signal is generated by performing a PWM on an output voltage provided at an output node coupled to a second terminal of the inductor. The amplifying circuit generates an amplified voltage signal having a voltage level proportional to the dead time by amplifying the DC voltage signal.

According to example embodiments, a DC-DC converter includes a voltage converting circuit, a pulse-width modulation (PWM) signal generator and a dead time controller. The voltage converting circuit generates: an output voltage at an output node by converting a power supply voltage based on a control voltage signal and a PWM signal, a first driving control signal applied to a first power transistor to pull-up a switching node coupled to a first terminal of an inductor included in the DC-DC converter, and a second driving control signal applied to a second power transistor to pull-down the switching node. The PWM signal generator generates the PWM signal based on a feedback voltage having a voltage level proportional to the output voltage. The dead time controller generates the control voltage signal and an amplified voltage signal based on the first driving control signal and the second driving control signal. The control voltage signal is associated with adjusting a dead time corresponding to an overlapped deactivation interval between the first driving control signal and the second driving control signal and the amplified voltage signal has a voltage level proportional to the dead time.

According to example embodiments, a dead time controller in a DC-DC converter includes a phase detector, a filter circuit, an amplifying circuit and a compensation circuit. The phase detector generates a detection signal by detecting a phase difference between a first driving control signal applied to a first power transistor configured to pull-up a switching node coupled to a first terminal of an inductor included in the DC-DC converter and a second driving control signal applied to the first power transistor configured to pull-down the switching node, the detection signal being associated with a dead time corresponding to an overlapped deactivation interval between the first driving control signal and the second driving control signal. The filter circuit generates a DC voltage signal by filtering and averaging the detection signal based on a pulse-width modulation (PWM) signal. The PWM signal is generated by performing a PWM on an output voltage provided at an output node coupled to a second terminal of the inductor. The amplifying circuit generates an amplified voltage signal having a voltage level proportional to the dead time by amplifying the DC voltage signal. The compensation circuit generates a control voltage signal associated with controlling a duration of the dead time, based on the at least one amplified voltage signal and a reference voltage. The compensation circuit adjusts the control voltage signal such that the amplified voltage signal follows a reference voltage.

The dead time controller and the DC-DC converter including the dead time controller according to example embodiments, may measure dead time by converting the dead time between driving control signals applied to power transistors therein to a voltage signal. Therefore, the dead time controller and the DC-DC converter may easily detect the dead time and may adaptively adjust the dead time based on the voltage signal.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
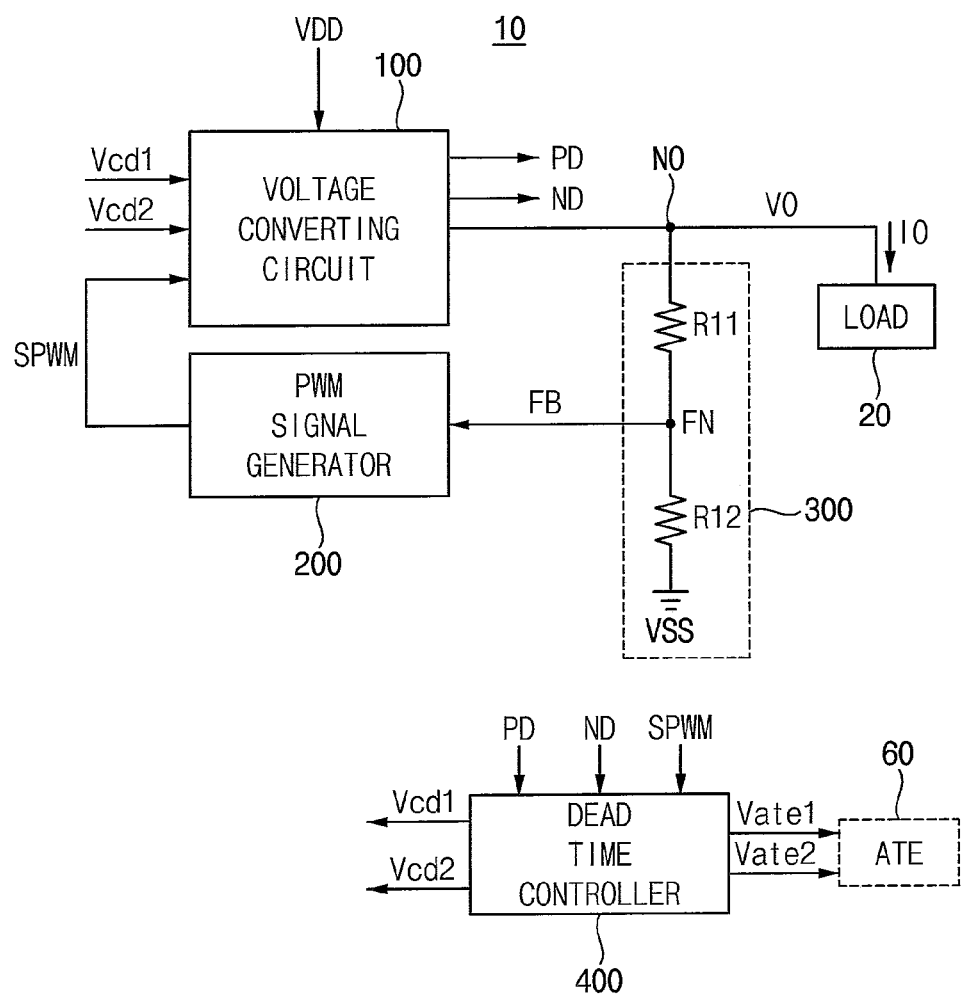
FIG. 1 is a block diagram illustrating a DC-DC converter including a dead time controller according to example embodiments.

Various example embodiments will be described more fully hereinafter with reference to the accompanying drawings, in which some example embodiments are shown. In the drawings, like numerals refer to like elements throughout. The repeated descriptions may be omitted.

In a DC-DC converter, a reliability of an operation of a power transistor which directly provides a power to an internal circuit may be important. Generally, a power transistor performs a switching operation based on a dead time corresponding to an overlapped deactivation interval of driving control signals applied to power transistors connected in series. When the dead time is short, the power transistors may be simultaneously turned-on and a chip including the power transistors may be seriously damaged. On the contrary, when the dead time is long, efficiency of the DC-DC converter may be degraded. Controlling the dead time may influence efficiency of the DC-DC converter and operation reliability of the DC-DC converter and thus, it is important to control the dead time.

FIG. 1 is a block diagram illustrating a DC-DC converter including a dead time controller according to example embodiments.

Referring to FIG. 1, a DC-DC converter 10 may include a voltage converting circuit 100, a pulse-width modulation (PWM) signal generator 200, a feedback circuit 300 and a dead time controller 400. In FIG. 1, a load 20 coupled to an output node NO of the DC-DC converter 100 and an automated test equipment (ATE) 60 are also shown for convenience of explanation.

The voltage converting circuit 100 may generate an output voltage VO at an output node NO by converting an input voltage (e.g., a power supply voltage VDD) based on a PWM signal SPWM. A configuration of the voltage converting circuit 100 may be implemented variously depending on the function of the DC-DC converter 10. In addition, the voltage converting circuit 100 may generate a first driving control signal PD and a second driving control signal ND which drive power transistors in the voltage converting circuit 100.

In some example embodiments, the voltage converting circuit 100 may have a configuration corresponding to a buck converter to convert a relatively high DC voltage to a relatively low DC voltage.

In some example embodiments, the voltage converting circuit 100 may have a configuration corresponding to a boost converter to convert a relatively low DC voltage to a relatively high DC voltage.

In some example embodiments, the voltage converting circuit 100 may have a configuration corresponding to a buck-boost converter to convert an input DC voltage to an output DC voltage having a higher or lower voltage level than the input DC voltage.

The PWM signal generator 200 may generate the PWM signal SPWM based on a feedback voltage FB having a voltage level proportional to the output voltage VO. The PWM signal generator 200 may generate the PWM signal SPWM by performing a PWM on the feedback voltage FB.

The feedback circuit 300 may generate the feedback voltage FB that is proportional to the output voltage VO. For example, as illustrated in FIG. 1, the feedback circuit 300 may include (dividing) resistors R11 and R12 to generate the feedback voltage FB corresponding to a ratio of resistance values of the resistors R11 and R12, but example embodiments are not limited thereto.

In the example embodiment of FIG. 1, the feedback voltage FB is determined by a relation of FB=VO*R12/(R11+R12). The resistors R11 and R12 may be connected in series between the output node NO and a ground voltage VSS and may be connected to each other at a feedback node FN. The feedback circuit 300 may output the feedback voltage FB at the feedback node FN.

The dead time controller 400 may receive the PWM signal SPWM, the first driving control signal PD and the second driving control signal ND, may generate at least one of control voltage signals Vcd1 and Vcd2 associated with adjusting a dead time corresponding to an overlapped deactivation interval between the first driving control signal PD and the second driving control signal ND and may generate at least one of amplified voltage signals Vate1 and Vate2 which has a voltage level proportional to the dead time, based on the first driving control signal PD and the second driving control signal ND.

The dead time controller 400, in an adjusting mode, may provide at least one of the control voltage signals Vcd1 and Vcd2 to the voltage converting circuit 100. The dead time controller 400, in a detection mode or in a test mode, may provide at least one of the amplified voltage signals Vate1 and Vate2 to the ATE 60.

The voltage converting circuit 100 may adjust a dead time between the first driving control signal PD and the second driving control signal ND based on at least one of the control voltage signals Vcd1 and Vcd2.

The ATE 60 may receive at least one of the amplified voltage signals Vate1 and Vate2, may measure the dead time between the first driving control signal PD and the second driving control signal ND and may determine whether the measured dead time has a desired value.

Figure 2:
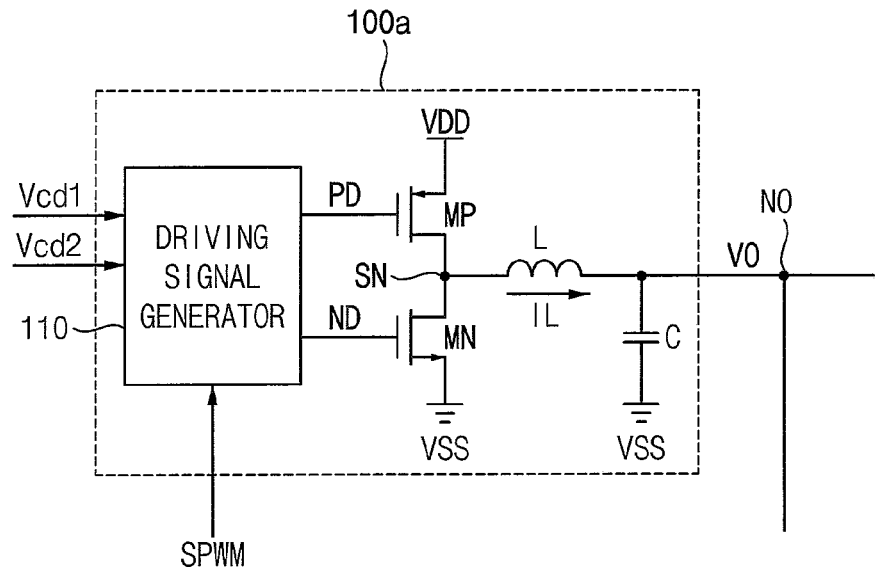
FIG. 2 is a diagram illustrating an example of a voltage converting circuit in the DC-DC converter of FIG. 1 according to example embodiments.

FIG. 2 is a diagram illustrating an example of a voltage converting circuit in the DC-DC converter of FIG. 1 according to example embodiments.

Referring to FIG. 2, a voltage converting circuit 100a may include a driving signal generator 110, a first power transistor MP, a second power transistor MN, an inductor L and a capacitor C.

The inductor L may be coupled between a switching node SN and the output node NO. The capacitor C may be coupled between the output node NO and the ground voltage VSS and the capacitor C may be charged with the output voltage VO. That is, the output voltage VO may be stored in the capacitor C.

The voltage converting circuit 100a may generate an output voltage VO at an output node NO by converting an input voltage, that is, a power supply voltage VDD, based on a PWM signal SPWM. The configuration of the voltage converting circuit 100a of FIG. 2 corresponds to a buck converter.

The first power transistor MP may be connected between the power supply voltage VDD and the switching node SN and the second power transistor NM may be connected between the switching node SN and the ground voltage VSS.

The first power transistor MP may include a p-channel metal-oxide semiconductor (PMOS) transistor which has a source coupled to the power supply voltage VDD, a gate receiving the first driving control signal PD and a drain coupled to the switching node SN. The second power transistor MN may include an n-channel metal-oxide semiconductor (NMOS) transistor which has a drain coupled to the switching node SN, a gate receiving the second driving control signal ND and a source coupled to the ground voltage VSS.

The driving signal generator 110 may generate the first driving control signal PD and the second driving control signal ND which have a dead time based on the PWM signal SPWM, and may adjust a duration of the dead time between the first driving control signal PD and the second driving control signal ND based on at least one of the control voltage signals Vcd1 and Vcd2.

The first power transistor MP may be turned on to pull up a voltage of a switching node SN in response to the first driving control signal PD being activated in a low level. The second power transistor MN may be turned on to pull down the voltage of the switching node SN in response to the second driving control signal ND being activated in a high level.

The inductor L and the capacitor C may act as a low pass filter and filter the voltage of the switching node SN to provide the output voltage VO to the output node NO. An inductor current IL may flow into the output node NO from the switching node SN.

Figure 3:
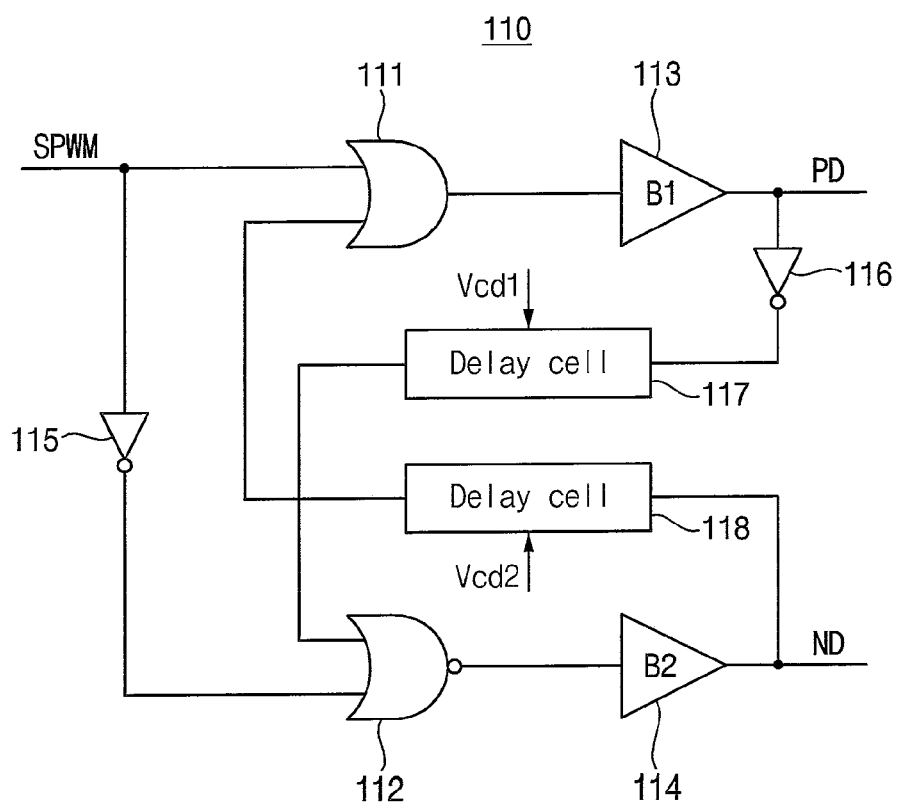
FIG. 3 is a block diagram illustrating an example of a driving signal generator in the voltage converting circuit of FIG. 2 according to example embodiments.

FIG. 3 is a block diagram illustrating an example of a driving signal generator in the voltage converting circuit of FIG. 2 according to example embodiments.

Referring to FIG. 3, the driving signal generator 110 may include an OR gate 111, a NOR gate 112, a first buffer B1 113, a second buffer B2 114, a first inverter 115, a second inverter 116, a first delay cell 117 and a second delay cell 118.

The second inverter 116 may invert the first driving control signal PD to output an inverted version of the first driving control signal PD.

The first delay cell 117 may delay the inverted version of the first driving control signal PD by a first delay amount and may adjust the first delay amount based on a first control voltage signal Vcd1. The second delay cell 118 may delay the second driving control signal ND by a second delay amount and may adjust the second delay amount based on a second control voltage signal Vcd2.

The OR gate 111 may perform an OR operation on the PWM signal SPWM and an output of the second delay cell 118, and the first buffer 113 may output the first driving control signal PD by buffering an output of the OR gate 111.

The first inverter 115 may invert the PWM signal SPWM to output an inverted version of the PWM signal SPWM, and the NOR gate 112 perform a NOR operation on the inverted version of the PWM signal SPWM and an output of the first delay cell 117. The second buffer 114 may output the second driving control signal ND by buffering an output of the NOR gate 112.

Each of the first delay cell 117 and the second delay cell 118 may include a delay circuit implemented with a complementary metal-oxide semiconductor (CMOS) inverter or a combination of a resistor and a capacitor. In this case, each of the first delay cell 117 and the second delay cell 118 may have a delay amount depending on a process, a voltage and a temperature and thus it may be very difficult to control the delay amount of the first delay cell 117 and the second delay cell 118.

On the contrary, the dead time controller 400 according to example embodiments may adaptively adjust the dead time between the first driving control signal PD and the second driving control signal ND by applying, to the first delay cell 117 and the second delay cell 118, at least one of the control voltage signals Vcd1 and Vcd2 which compensates for difference of the delay amount depending on the process, the voltage and the temperature.

Figure 4:
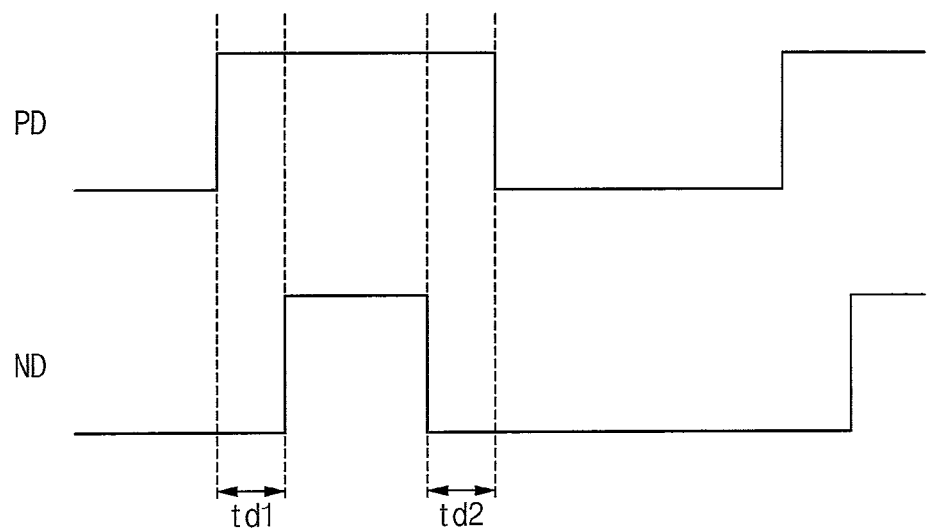
FIG. 4 illustrates an example of the first driving control signal and the second driving control signal in the driving signal generator in FIG. 3 according to example embodiments.

FIG. 4 illustrates an example of the first driving control signal and the second driving control signal in the driving signal generator in FIG. 3 according to example embodiments.

Referring to FIGS. 2, 3 and 4, because the first driving control signal PD is activated in a low level and the second driving control signal ND is activated in a high level, the first driving control signal PD and the second driving control signal ND may have dead times td1 and td2 and each of the dead times td1 and td2 correspond to an overlapped deactivation interval between the first driving control signal PD and the second driving control signal ND.

When durations of the dead times td1 and td2 are very small, the first power transistor MP and the second power transistor MN may be simultaneously turned on. When the first power transistor MP and the second power transistor MN are simultaneously turned on, an overcurrent may flow into the first power transistor MP and the second power transistor MN and the first power transistor MP and the second power transistor MN may be damaged due to the overcurrent.

In addition, because the durations of the dead times td1 and td2 are very small, it is very difficult to measure the durations of the dead times td1 and td2. Therefore, it is difficult to determine whether the durations of the dead times td1 and td2 have target durations of a designer or in a specification.

Because the DC-DC converter 10 of FIG. 1 converts the dead times td1 and td2 to the amplified voltage signals Vate1 and Vate2 which have a voltage level proportional to the durations of the dead times td1 and td2, respectively, the ATE may easily measure the durations of the dead times td1 and td2, and the dead time controller 400 may adjust the durations of the dead times td1 and td2 using the control voltage signals Vcd1 and Vcd2.

Figure 5:
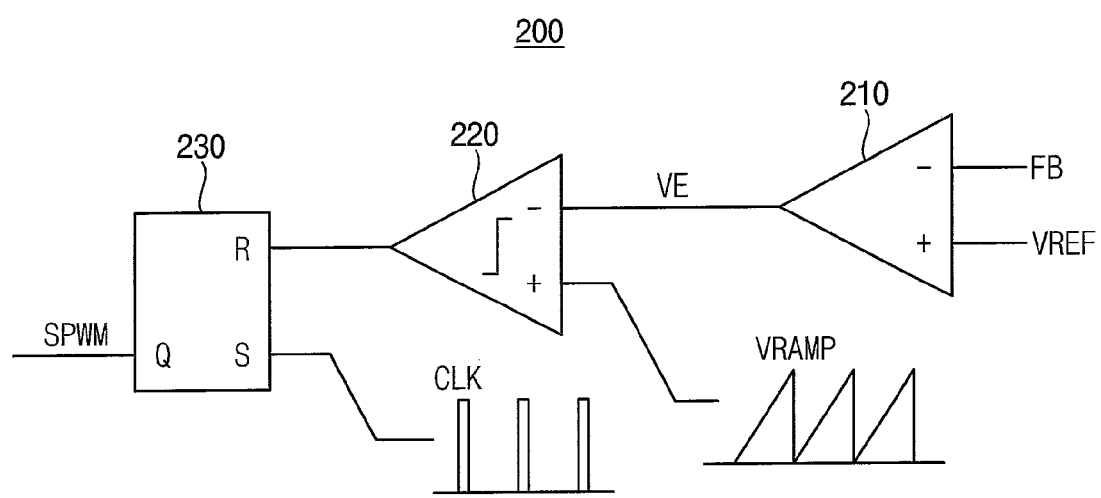
FIG. 5 is a diagram illustrating an example of a PWM signal generator in the DC-DC converter of FIG. 1 according to example embodiments.
Figure 6:
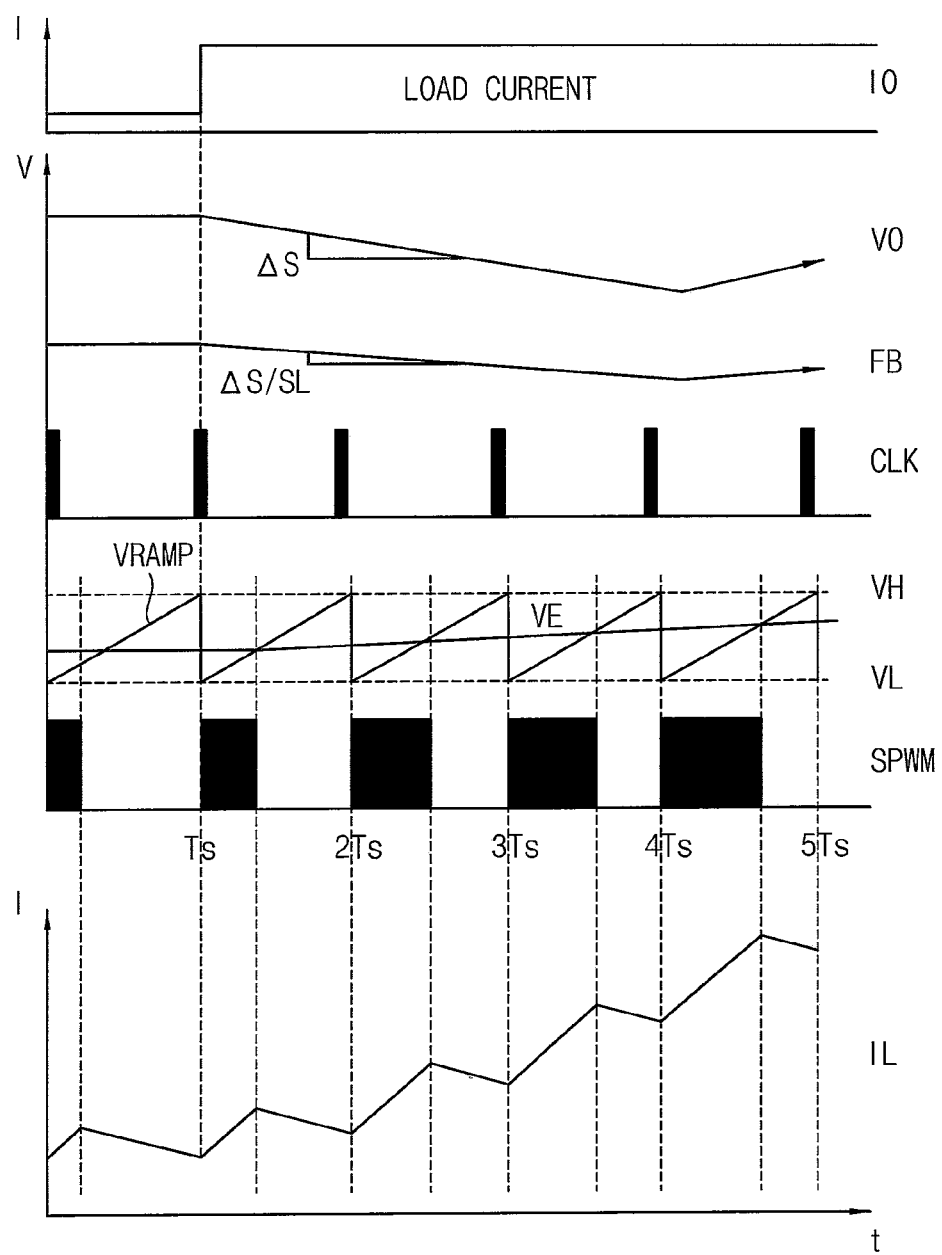
FIG. 6 is a diagram illustrating an operation of the DC-DC converter of FIG. 1 in a PWM mode according to example embodiments.

FIG. 5 is a diagram illustrating an example of a PWM signal generator in the DC-DC converter of FIG. 1 according to example embodiments, and FIG. 6 is a diagram illustrating an operation of the DC-DC converter of FIG. 1 in a PWM mode according to example embodiments.

FIG. 6 illustrates a process of increasing the inductor current IL in the PWM mode when a load current IO is increased. In FIG. 6, A S indicates a slope of the output voltage VO of the DC-DC converter 10 and A S/SL indicates a slope of the feedback voltage FB.

Referring to FIGS. 5 and 6, the PWM signal generator 200 may include an amplifier 210, a comparator 220 and a flip-flop 230.

The amplifier 210 may generate an error voltage VE based on the feedback voltage FB and a reference voltage VREF. The comparator 220 may compare the error voltage VE to a ramp signal VRAMP. The flip-flop 230 may receive the output of the comparator 220 at a reset terminal R, receive a clock signal CLK at a set terminal S and output the PWM signal SPWM at an output terminal Q. The operation of the PWM mode is well known to those skilled art and detailed descriptions are omitted.

As illustrated in FIG. 6, if the load current IO is increased abruptly at a time point Ts, the output voltage VO and the feedback voltage FB are decreased and thus the duty ratio of the PWM signal SPWM is increased. The inductor current IL of the voltage converting circuit 100a of FIG. 2 is increased as the duty ratio of the PWM signal SPWM is increased. As a result, the decreased output voltage VO may be compensated by the increased duty ratio to maintain a target level of the output voltage VO.

Even though not illustrated in FIG. 6, if the load current IO is decreased abruptly, the output voltage VO is increased and thus the duty ratio of the PWM signal SPWM is decreased. The inductor current IL is decreased as the duty ratio of the PWM signal SPWM is decreased. As a result, the increased output voltage VO may be compensated by the decreased duty ratio to maintain the target level of the output voltage VO.

As illustrated in FIG. 6, the PWM signal SPWM may be generated in response to the clock signal CLK that is activated periodically at time points Ts~5Ts.

In FIG. 6, Ts denotes a switching period of the PWM signal SPWM.

Figure 7:
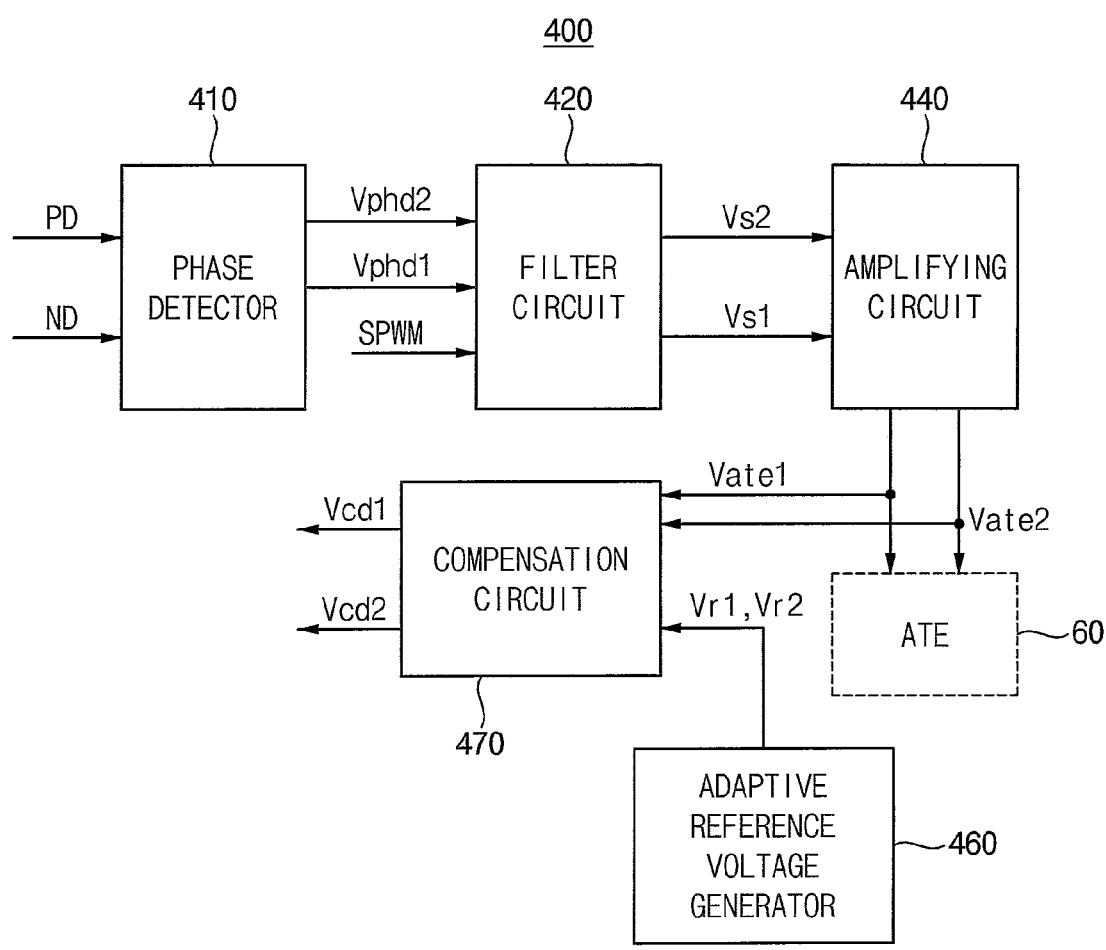
FIG. 7 is a block diagram illustrating an example of a dead time controller in the DC-DC converter of FIG. 1 according to example embodiments.

FIG. 7 is a block diagram illustrating an example of a dead time controller in the DC-DC converter of FIG. 1 according to example embodiments.

In FIG. 7, the ATE 60 is also illustrated for convenience of explanation.

Referring to FIG. 7, the dead time controller 400 may include a phase detector 410, a filter circuit 420, an amplifying circuit 440 and a compensation circuit 470. In example embodiments, the dead time controller 400 may further include an adaptive reference voltage generator 460.

The phase detector 410 may detect a phase difference between the first driving control signal PD applied to the first power transistor MP in FIG. 2 and the second driving control signal ND applied to second power transistor MN in FIG. 2 to generate at least one of detection signals Vphd1 and Vphd2 associated with a dead time corresponding to an overlapped deactivation interval between the first driving control signal PD and the second driving control signal ND. The first detection signal Vphd1 may be associated with a first dead time associated with a rising edge of the PWM signal SPWM and the second detection signal Vphd2 may be associated with a second dead time associated with a falling edge of the PWM signal SPWM.

The filter circuit 420 may filter and average at least one of the detection signals Vphd1 and Vphd2 to generate at least one of DC voltage signals Vs1 and Vs2 based on the PWM signal SPWM.

The amplifying circuit 440 may amplify at least one of the DC voltage signals Vs1 and Vs2 to generate at least one of the amplified voltage signal Vate1 and Vate2 having a voltage level proportional to the dead time. The amplifying circuit 440, in the detection mode (or in the test mode) may provide at least one of the amplified voltage signals Vate1 and Vate2 to the ATE 60. The amplifying circuit 440, in the adjusting mode may provide at least one of the amplified voltage signals Vate1 and Vate2 to the compensation circuit 470.

The ATE 60 may receive at least one of the amplified voltage signals Vate1 and Vate2 and may determine whether the dead time has a target duration based on at least one of the amplified voltage signals Vate1 and Vate2. Because at least one of the amplified voltage signals Vate1 and Vate2 have a voltage level proportional to the dead time, the ATE 60 may easily measure the dead time between the first driving control signal PD and the second driving control signal ND based on at least one of the amplified voltage signals Vate1 and Vate2.

The compensation circuit 470 may generate at least one of the voltage control signals Vcd1 and Vcd2 associated with adjusting duration of the dead time based on at least one of the amplified voltage signals Vate1 and Vate2 and at least one of reference voltages Vr1 and Vr2. For example, the adaptive reference voltage generator 460 may generate at least one of the reference voltages Vr1 and Vr2. The compensation circuit 470 may provide at least one of the voltage control signals Vcd1 and Vcd2 to the driving signal generator 110 in FIG. 2.

Figure 8:
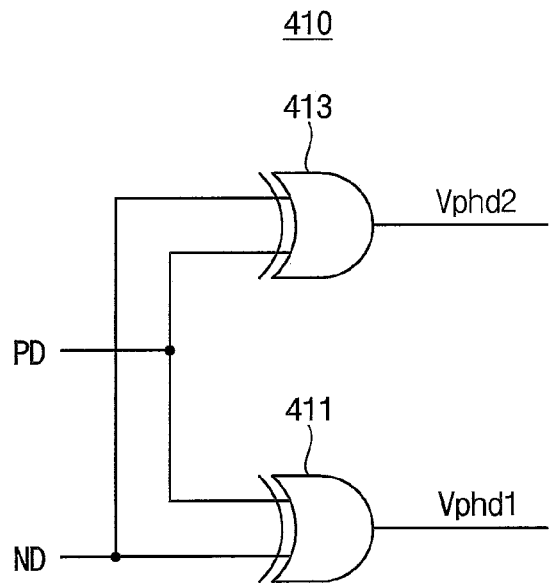
FIG. 8 is a circuit diagram illustrating an example of a phase detector in the dead time controller of FIG. 7 according to example embodiments.

FIG. 8 is a circuit diagram illustrating an example of a phase detector in the dead time controller of FIG. 7 according to example embodiments.

Referring to FIG. 8, the phase detector 410 may include a first exclusive OR gate 411 and a second exclusive OR gate 413.

The first exclusive OR gate 411 may perform an exclusive OR operation on the first driving control signal PD and the second driving control signal ND to output the first detection signal Vphd1. The first exclusive OR gate 413 may perform an exclusive OR operation on the first driving control signal PD and the second driving control signal ND to output the second detection signal Vphd2. Each of the first detection signal Vphd1 and the second detection signal Vphd2 may represent a duration of the dead time and the first detection signal Vphd1 may be the same as the second detection signal Vphd2. In other example embodiments, the phase detector 410 may include only one exclusive OR gate and output only one detection signal Vphd.

Figure 9:
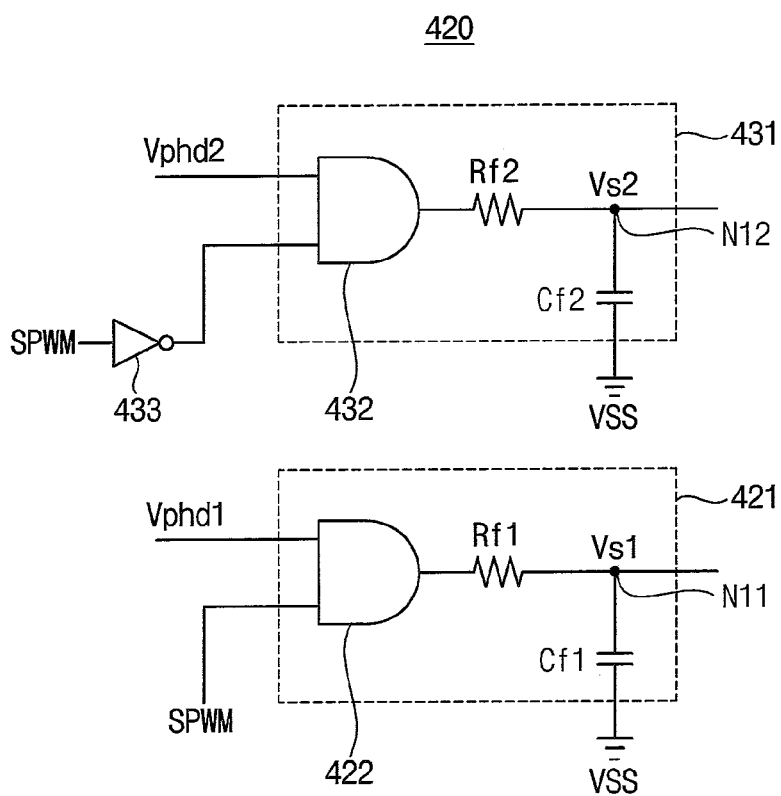
FIG. 9 is a circuit diagram illustrating an example of a filter circuit in the dead time controller of FIG. 7 according to example embodiments.

FIG. 9 is a circuit diagram illustrating an example of a filter circuit in the dead time controller of FIG. 7 according to example embodiments.

Referring to FIG. 9, the filter circuit 420 may include a first filter 421, a second filter 431 and an inverter 433.

The first filter 421 may include a first AND gate 422, a first filter resistor Rf1 and a first filter capacitor Cf1. The first filter resistor Rf1 may be connected between the AND gate 422 and a first node N11 and the first filter capacitor Cf1 may be coupled between the first node N11 and the ground voltage VSS.

The first AND gate 422 may perform a first AND operation on the first detection signal Vphd1 and the PWM signal SPWM. The first filter resistor Rf1 and the first filter capacitor Cf1 may perform low-pass filtering on an output of the first AND gate 422 to provide the first DC voltage signal Vs1 at the first node N11.

Therefore, the first filter 421 may average the first detection signal Vphd1 during an interval in which the PWM signal SPWM is in a high level. That is, the first DC voltage signal Vs1 may be associated with the dead time at a rising edge of the PWM signal SPWM.

The second filter 431 may include a second AND gate 432, a second filter resistor Rf2 and a second filter capacitor Cf2. The second filter resistor Rf2 may be connected between the second AND gate 432 and a second node N12 and the second filter capacitor Cf2 may be coupled between the second node N12 and the ground voltage VSS.

The inverter 433 may invert the PWM signal SPWM and the second AND gate 432 may perform a second AND operation on the second detection signal Vphd2 and an inverted version of the PWM signal SPWM (i.e., an output of the inverter 433). The second filter resistor Rf2 and the second filter capacitor Cf2 may perform low-pass filtering on an output of the second AND gate 432 to provide the second DC voltage signal Vs2 at the second node N12.

Therefore, the second filter 431 may average the second detection signal Vphd2 during an interval in which the PWM signal SPWM is in a low level. For example, the second DC voltage signal Vs2 may be associated with the dead time at a falling edge of the PWM signal SPWM.

Figure 10:
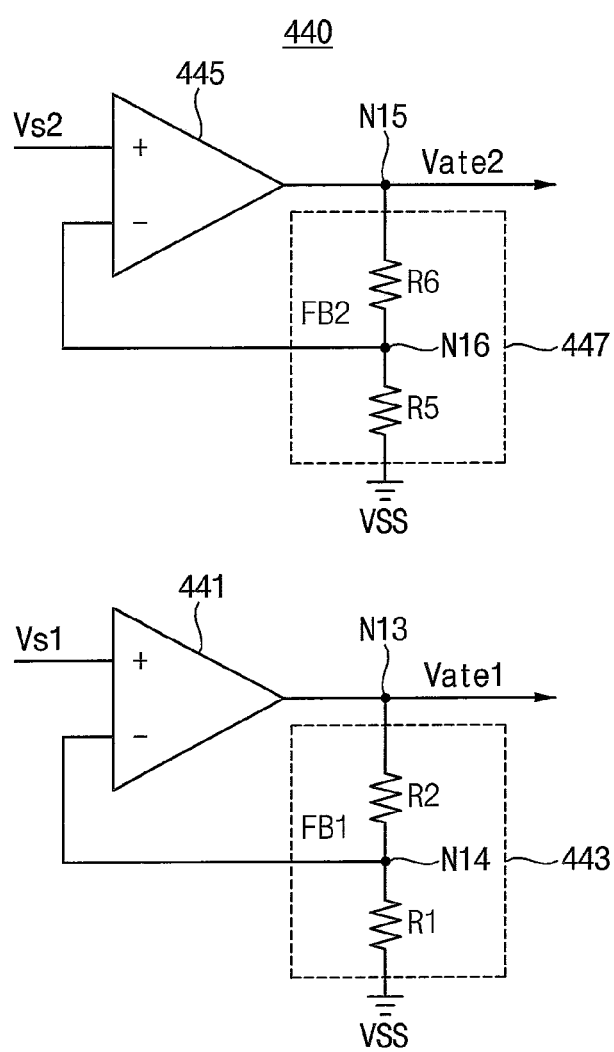
FIG. 10 is a circuit diagram illustrating an example of an amplifying circuit in the dead time controller of FIG. 7 according to example embodiments.

FIG. 10 is a circuit diagram illustrating an example of an amplifying circuit in the dead time controller of FIG. 7 according to example embodiments.

Referring to FIG. 10, the amplifying circuit 440 may include a first amplifier 441, a first feedback circuit 443, a second amplifier 445 and a second feedback circuit 447.

The first amplifier 441 may amplify a voltage difference between the first DC voltage signal Vs1 and a first feedback voltage FB1 to output the first amplified voltage signal Vate1 at a third node N13. The first feedback voltage FB1 may have a voltage level proportional to the first amplified voltage signal Vate1.

The first amplifier 441 may have a positive input terminal receiving the first DC voltage signal Vs1, a negative input terminal coupled to a fourth node N14 to receive the first feedback voltage FB1 and an output terminal coupled to the third node N13 to provide the first amplified voltage signal Vate1.

The first feedback circuit 443 may be connected between the third node N13 and the ground voltage VSS. The first feedback circuit 443 may include a first resistor R1 and a second resistor R2. The first resistor R1 is connected between the fourth node N14 and the ground voltage VSS and the second resistor R2 is connected between the third node N13 and the fourth node N14. The first feedback circuit 443 may output the first feedback voltage FB1 at the fourth node N14 by dividing the first amplified voltage signal Vate1 with a ratio of resistances of the first and second resistors R1 and R2.

The second amplifier 445 may amplify a voltage difference between the second DC voltage signal Vs2 and a second feedback voltage FB2 to output the second amplified voltage signal Vate2 at a fifth node N15. The second feedback voltage FB2 may have a voltage level proportional to the second amplified voltage signal Vate2.

The second amplifier 445 may have a positive input terminal receiving the second DC voltage signal Vs2, a negative input terminal coupled to a sixth node N16 to receive the second feedback voltage FB2 and an output terminal coupled to the fifth node N15 to provide the second amplified voltage signal Vate2.

The second feedback circuit 447 may be connected between the fifth node N15 and the ground voltage VSS. The second feedback circuit 447 may include a third resistor R5 and a fourth resistor R6. The third resistor R5 is connected between the sixth node N16 and the ground voltage VSS, and the fourth resistor R6 is connected between the fifth node N15 and the sixth node N16. The second feedback circuit 447 may output the second feedback voltage FB2 at the sixth node N16 by dividing the second amplified voltage signal Vate2 with a ratio of resistances of the third and fourth resistors R5 and R6.

Figure 11:
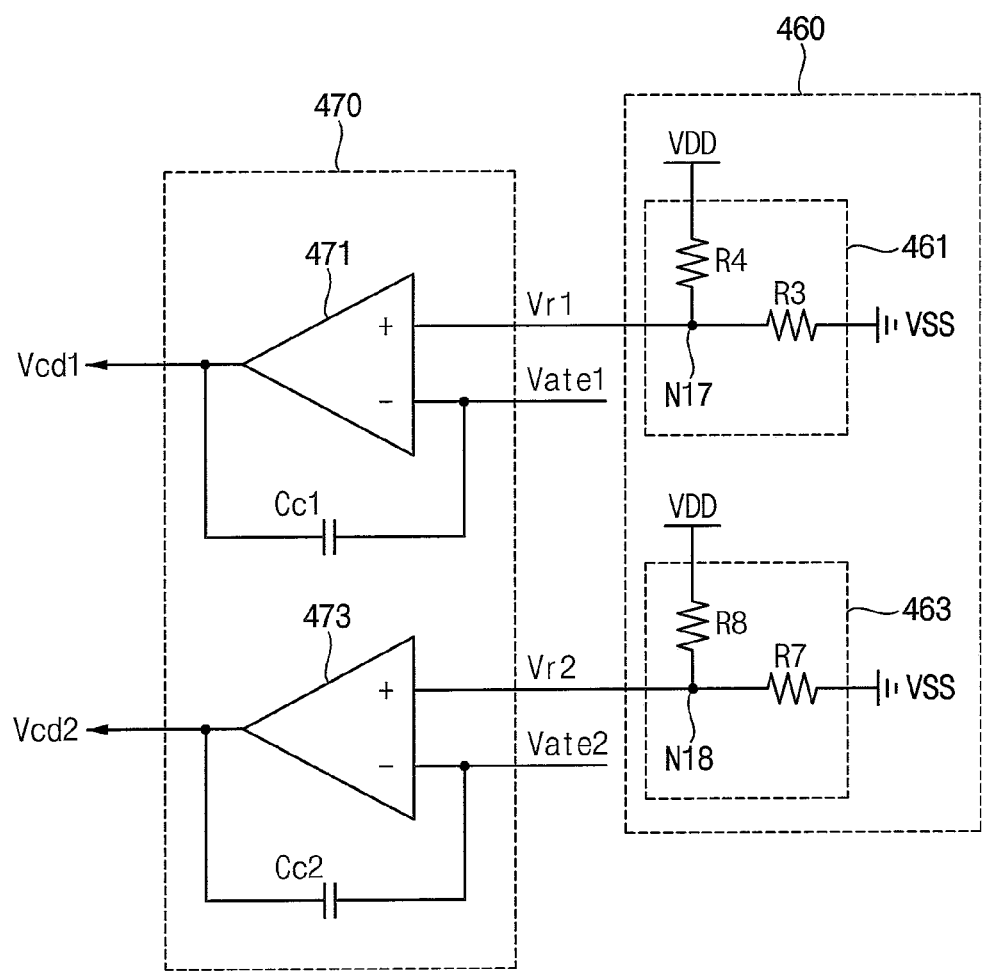
FIG. 11 is a circuit diagram illustrating an example of a compensation circuit and an adaptive reference voltage generator in the dead time controller of FIG. 7 according to example embodiments.

FIG. 11 is a circuit diagram illustrating an example of a compensation circuit and an adaptive reference voltage generator in the dead time controller of FIG. 7 according to example embodiments.

Referring to FIG. 11, the adaptive reference voltage generator 460 may include a first reference voltage generator 461 and a second reference voltage generator 463 and the compensation circuit 470 may include a third amplifier 471, a first compensation capacitor Cc1, a fourth amplifier 473 and a second compensation capacitor Cc2.

The first reference voltage generator 461 may include resistors R3 and R4 which are connected in series between the power supply voltage VDD and the ground voltage VSS and connected to each other at a seventh node N17. The first reference voltage generator 461 may generate the first reference voltage Vr1 at the seventh node N17 by dividing the power supply voltage VDD with a ratio of resistances of the resistors R4 and R3 and may provide the first reference voltage Vr1 to the third amplifier 471 as a positive input signal.

The second reference voltage generator 463 may include resistors R7 and R8 which are connected in series between the power supply voltage VDD and the ground voltage VSS and connected to each other at an eighth node N18. The second reference voltage generator 463 may generate the second reference voltage Vr2 at the eighth node N18 by dividing the power supply voltage VDD with a ratio of resistances of the resistors R8 and R7 and may provide the second reference voltage Vr2 to the fourth amplifier 473 as a negative input signal.

The third amplifier 471 may have a positive input terminal receiving the first reference voltage Vr1, a negative input terminal to receive the first amplified voltage signal Vate1 and an output terminal to provide the first voltage control signal Vcd1. The first compensation capacitor Cc1 may be coupled between the negative input terminal of the third amplifier 471 and the output terminal of the third amplifier 471.

Therefore, the third amplifier 471 may amplify a voltage difference between the first reference voltage Vr1 and the first amplified voltage signal Vate1 to output the first voltage control signal Vcd1 associated with controlling duration of the first dead time such that the first voltage control signal Vcd1 follows the first amplified voltage signal Vate1.

The fourth amplifier 473 may have a positive input terminal receiving the second reference voltage Vr2, a negative input terminal to receive the second amplified voltage signal Vate2 and an output terminal to provide the first voltage control signal Vcd2. The second compensation capacitor Cc2 may be coupled between the negative input terminal of the fourth amplifier 473 and the output terminal of the fourth amplifier 473.

Therefore, the fourth amplifier 473 may amplify a voltage difference between the second reference voltage Vr2 and the second amplified voltage signal Vate2 to output the second voltage control signal Vcd2 associated with controlling duration of the second dead time such that the second voltage control signal Vcd2 follows the second amplified voltage signal Vate2.

Figure 12:
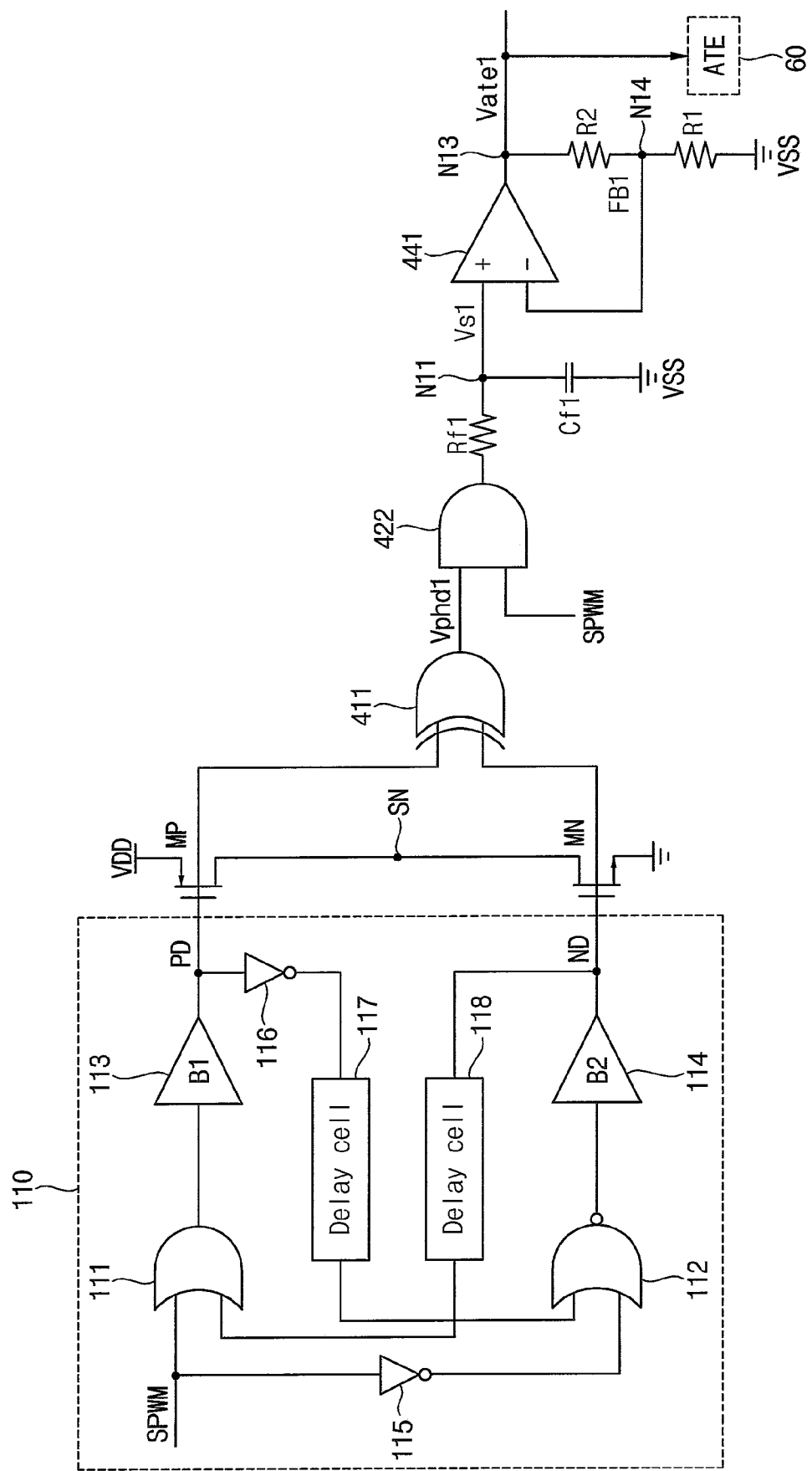
FIG. 12 illustrates an operation of the dead time controller of FIG. 7 when the ATE measures a first dead time in a detection mode according to example embodiments.

FIG. 12 illustrates an operation of the dead time controller of FIG. 7 when the ATE measures a first dead time in a detection mode according to example embodiments.

In FIG. 12, the driving signal generator 110 is also illustrated for convenience of explanation and assuming that the first power transistor MP is turned off and the second power transistor MN is turned on.

In addition, in FIG. 12, components in the filter circuit 420 of FIG. 9 and the amplifying circuit 440 of FIG. 10, which are associated with first dead time, are illustrated.

Referring to FIG. 12, because the first power transistor MP is turned off and the second power transistor MN is turned on, the first exclusive OR gate 411 may detect a phase difference between the first driving control signal PD and the second driving control signal ND to output the first detection signal Vphd1.

The first AND gate 422 may perform an AND operation on the first detection signal Vphd1 and the PWM signal SPWM and the first filter resistor Rf1 and the first filter capacitor Cf1 may perform low-pass filtering on the output of the first AND gate 422 to provide the first DC voltage signal Vs1.

The first amplifier 441 may amplify a voltage difference between the first DC voltage signal Vs1 and the first feedback voltage FB1 to provide the first amplified voltage signal Vate1 to the ATE 60. The ATE 60 may measure duration of the first dead time based on a voltage level of the first amplified voltage signal Vate1.

In FIG. 12, when the phase difference corresponds to the first dead time td1 in FIG. 2, the first DC voltage signal Vs1 may be represented by Equation 1.

$$Vs1 = VDD \times td1 \times 1/Ts \qquad \text{Equation 1}$$

In Equation 1, Ts denotes a switching period of the PWM signal SPWM.

When the first DC voltage signal Vs1 is amplified by a gain β, the first amplified voltage signal Vate1 may be represented by Equation 2.

$$Vate1 = Vs1 \times (3 = VDD \times td1 \times \beta/Ts \qquad \text{Equation 2}$$

For example, when the power supply voltage VDD is 5V, the first dead time td1 corresponds to 5 ns and Ts corresponds to 500 ns, the first DC voltage signal Vs1 corresponds to 50 mV. When β is set to 10, the first amplified voltage signal Vate1 corresponds to 0.5V and the ATE 60 measures the first dead time td1 to have 5 ns based on measuring the first amplified voltage signal Vate1 having 0.5V.

Figure 13:
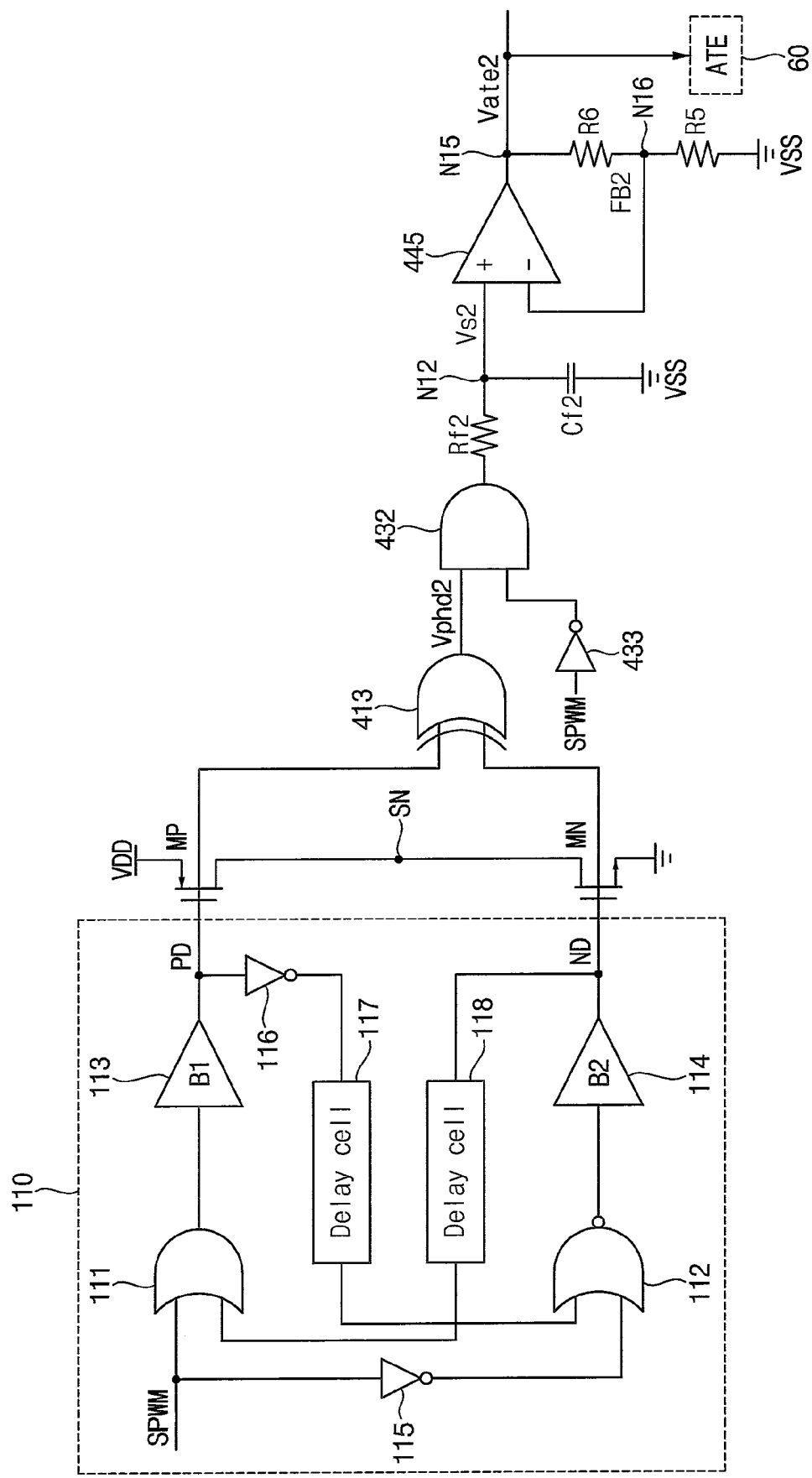
FIG. 13 illustrates an operation of the dead time controller of FIG. 7 when the ATE measures a second dead time in a detection mode according to example embodiments.

FIG. 13 illustrates an operation of the dead time controller of FIG. 7 when the ATE measures a second dead time in a detection mode according to example embodiments.

In FIG. 13, the driving signal generator 110 is also illustrated for convenience of explanation and assuming that the first power transistor MP is turned on and the second power transistor MN is turned off.

In addition, in FIG. 13, components in the filter circuit 420 of FIG. 9 and the amplifying circuit 440 of FIG. 10, which are associated with the second dead time td2, are illustrated.

Referring to FIG. 13, because the first power transistor MP is turned on and the second power transistor MN is turned off, the second exclusive OR gate 413 may detect a phase difference between the first driving control signal PD and the second driving control signal ND to output the second detection signal Vphd2.

The second AND gate 432 may perform an AND operation on the second detection signal Vphd2 and the inverted version of the PWM signal SPWM and the second filter resistor Rf2 and the second filter capacitor Cf2 may perform low-pass filtering on the output of the second AND gate 432 to provide the second DC voltage signal Vs2.

The second amplifier 445 may amplify a voltage difference between the second DC voltage signal Vs2 and the second feedback voltage FB2 to provide the second amplified voltage signal Vate2 to the ATE 60. The ATE 60 may measure duration of the second dead time td2 based on a voltage level of the second amplified voltage signal Vate2.

As described with reference to FIG. 12, the first dead time td1 in FIG. 4 may be measured.

As described with reference to FIG. 13, the second dead time td2 in FIG. 4 may be measured.

Figure 14:
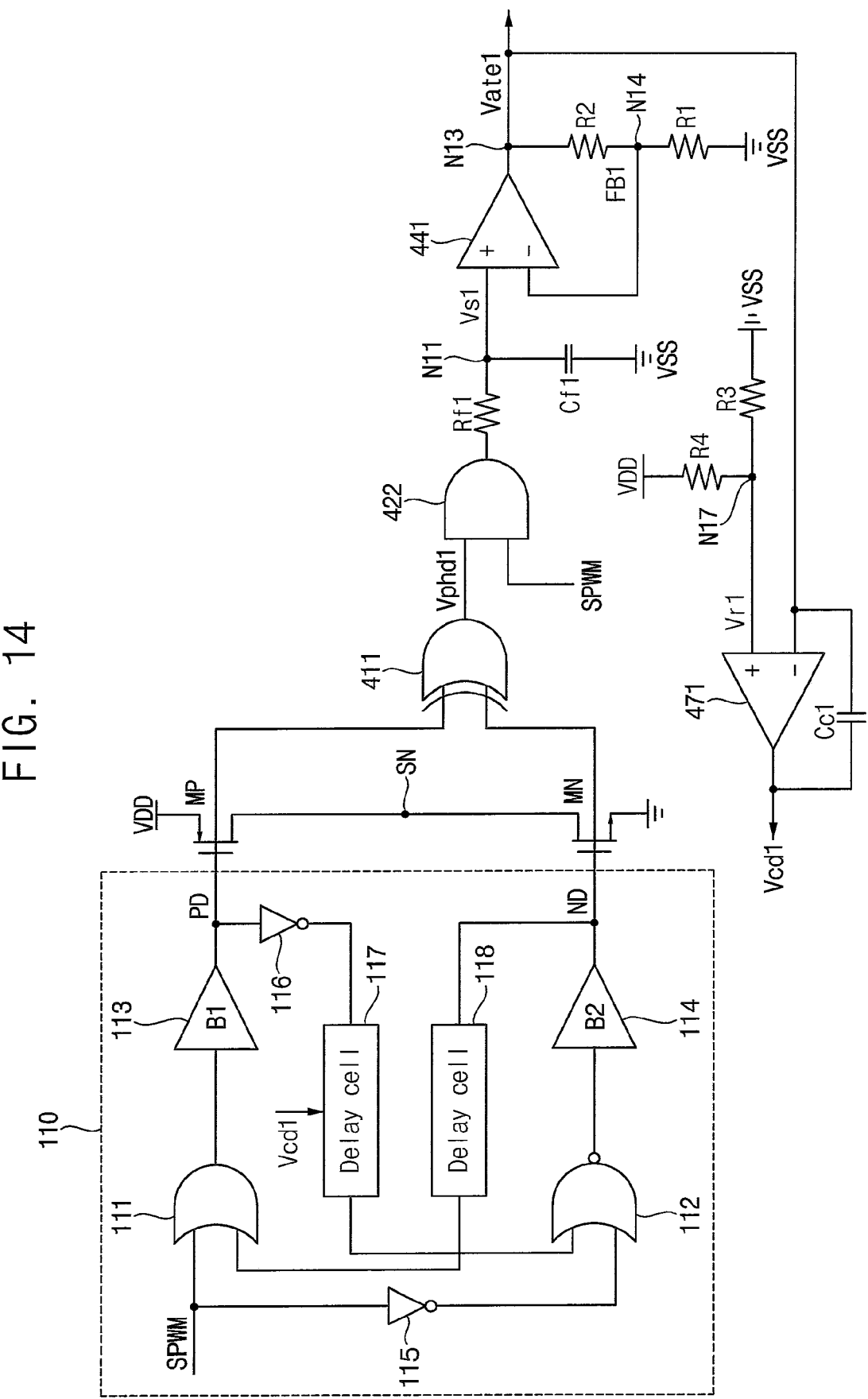
FIG. 14 illustrates an operation of the dead time controller of FIG. 7 when the compensate circuit adjusts a first dead time in an adjusting mode according to example embodiments.

FIG. 14 illustrates an operation of the dead time controller of FIG. 7 when the compensate circuit adjusts a first dead time in an adjusting mode according to example embodiments.

In FIG. 14, the driving signal generator 110 of FIG. 3 is also illustrated for convenience of explanation and assuming that the first power transistor MP is turned off and the second power transistor MN is turned on.

In addition, in FIG. 14, components in the filter circuit 420 of FIG. 9, the amplifying circuit 440 of FIG. 10, the adaptive reference voltage generator 460 in FIG. 11 and the compensation circuit 470 in FIG. 11, which are associated with first dead time, are illustrated.

The adjusting mode in FIG. 14 differs from the detection mode in FIG. 12 in that the first amplified voltage signal Vate1 is provided to the third amplifier 471. Descriptions repeated with FIG. 12 will be omitted.

The first amplifier 441 may amplify a voltage difference between the first DC voltage signal Vs1 and the first feedback voltage FB1 to provide the first amplified voltage signal Vate1 to the third amplifier 471. The third amplifier 471 may amplify a voltage difference between the first reference voltage Vr1 and the first amplified voltage signal Vate1 to output the first voltage control signal Vcd1 having a voltage level corresponding to the voltage difference between the first reference voltage Vr1 and the first amplified voltage signal Vate1.

The third amplifier 471 may provide the first voltage control signal Vcd1 to the first delay cell 117, and the first delay cell 117 may adjust a delay amount of the first driving control signal PD to adjust duration of the first dead time.

In FIG. 14, the first amplified voltage signal Vate1 may be represented by Equation 3.

$$Vate1 = Vs1 \times (1 + R2/R1) \quad \text{Equation 3}$$

When Equation 1 is employed by Equation 3, the first reference voltage Vr1 may be represented by Equation 4.

$$Vr1 = VDD \times (R3/(R3+R4)) \quad \text{Equation 4}$$

Here, since Vr1 may be replaced with Vate1, Equation 5 is obtained.

$$VDD \times (R3/(R3+R4)) = VDD \times td1 \times (1+R2/R1) \times 1/Ts \quad \text{Equation 5}$$

Here, if $R3/(R3+R4) = \alpha$ and $1+R2/R1 = \beta$, Equation 6 is obtained.

$$td1 = (\alpha \times Ts)/\beta \quad \text{Equation 6}$$

In Equation 6, the first dead time td1 may be represented by a ratio of resistors and may have a value without regard to the power supply voltage VDD. A designer may easily adjust the first dead time td1 by adjusting the ratio of resistors. For example, when the first dead time td1 corresponds to 5 ns, β is set to 10, R3 corresponds to 10 kΩ and Ts corresponds to 500 ns, R4 has 90 kΩ.

Figure 15:
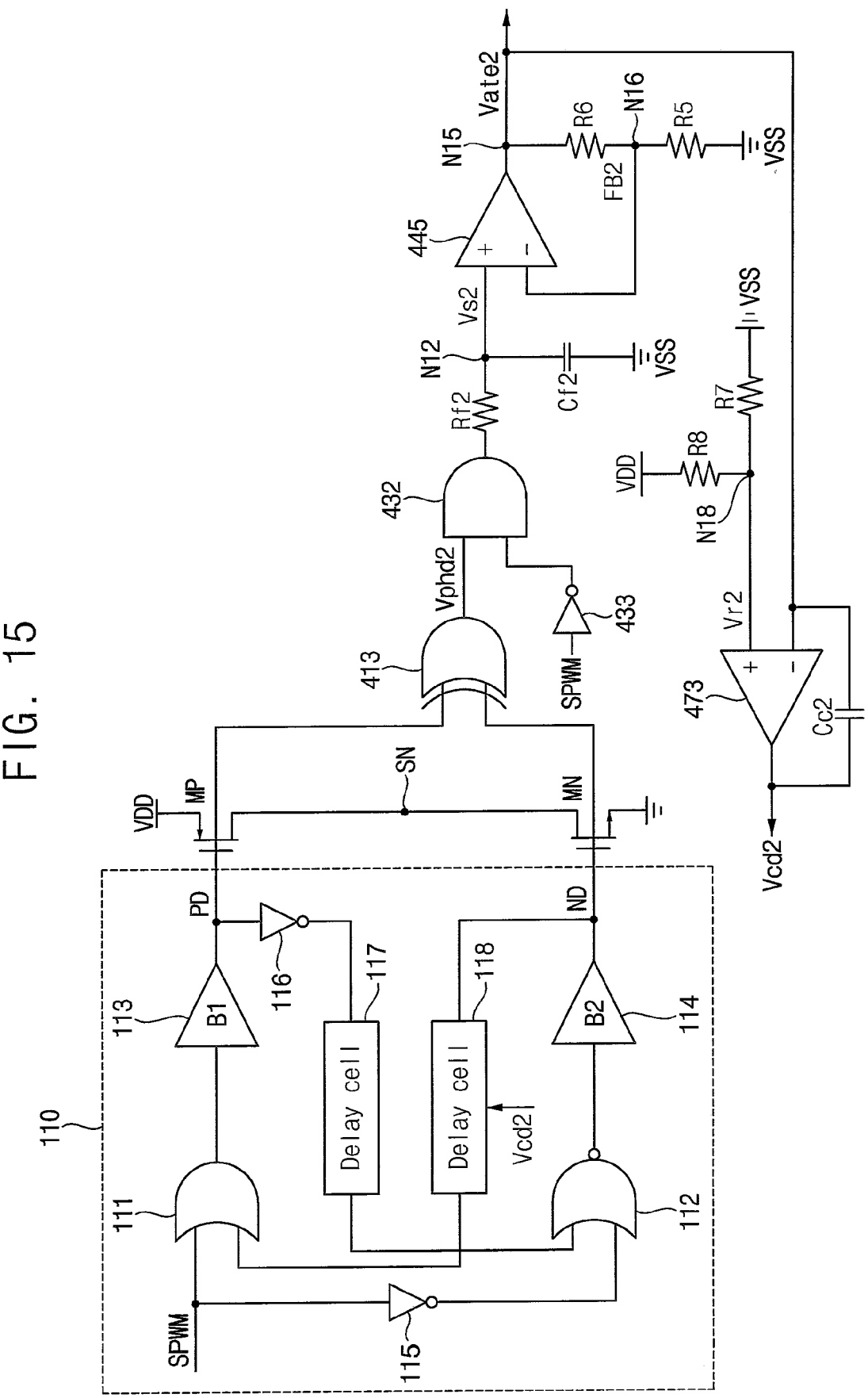
FIG. 15 illustrates an operation of the dead time controller of FIG. 7 when the compensate circuit adjusts a second dead time in an adjusting mode according to example embodiments.

FIG. 15 illustrates an operation of the dead time controller of FIG. 7 when the compensate circuit adjusts a second dead time in an adjusting mode according to example embodiments.

In FIG. 15, the driving signal generator 110 of FIG. 3 is also illustrated for convenience of explanation and assuming that the first power transistor MP is turned on and the second power transistor MN is turned off.

In addition, in FIG. 15, components in the filter circuit 420 of FIG. 9, the amplifying circuit 440 of FIG. 10, the adaptive reference voltage generator 460 in FIG. 11 and the compensation circuit 470 in FIG. 11, which are associated with second dead time, are illustrated.

The adjusting mode in FIG. 15 differs from the detection mode in FIG. 13 in that the second amplified voltage signal Vate2 is provided to the fourth amplifier 473. Descriptions repeated with FIG. 13 will be omitted.

The second amplifier 445 may amplify a voltage difference between the second DC voltage signal Vs2 and the second feedback voltage FB2 to provide the second amplified voltage signal Vate2 to the fourth amplifier 473. The fourth amplifier 473 may amplify a voltage difference between the second reference voltage Vr2 and the second amplified voltage signal Vate2 to output the second voltage control signal Vcd2 having a voltage level corresponding to the voltage difference between the second reference voltage Vr2 and the second amplified voltage signal Vate2.

The fourth amplifier 473 may provide the second voltage control signal Vcd2 to the second delay cell 118, and the second delay cell 118 may adjust a delay amount of the second driving control signal ND to adjust duration of the second dead time.

Figure 16:
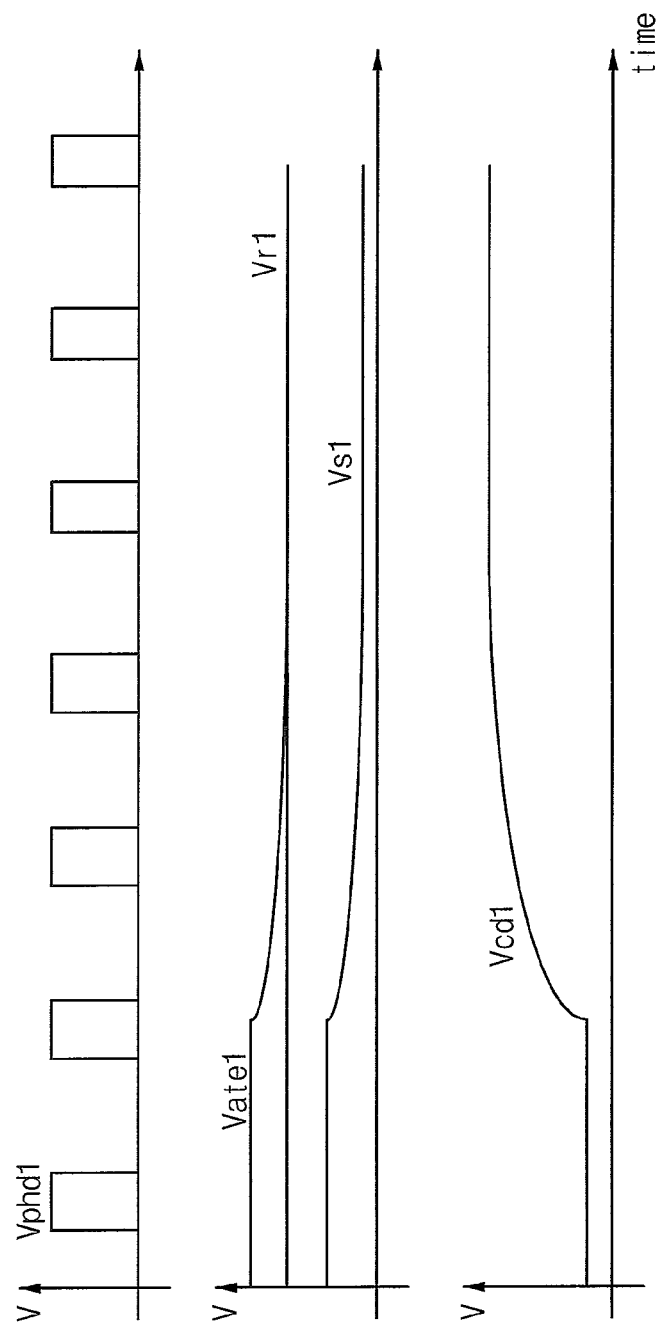
FIG. 16 illustrates waveforms of various signals in the dead time controller in FIG. 14 according to example embodiments.

FIG. 16 illustrates waveforms of various signals in the dead time controller in FIG. 14 according to example embodiments.

Referring to FIGS. 14 and 16, the first DC voltage signal Vs1 and the first amplified voltage signal Vate1 are generated based on the first detection signal Vphd1. As a voltage difference between the first reference voltage Vr1 and the first amplified voltage signal Vate1 decreases, a voltage level of the first control voltage signal Vcd1 increases and as the voltage difference between the first reference voltage Vr1 and the first amplified voltage signal Vate1 decreases, duration of the first detection signal Vphd1 decreases. As a voltage level of the first amplified voltage signal Vate1 equals to the first reference voltage Vr1, a voltage level of the first control voltage signal Vcd1 maintains a fixed level and as the voltage level of the first amplified voltage signal Vate1 equals to the first reference voltage Vr1, duration of the first detection signal Vphd1 maintains a fixed duration.

Figure 17:
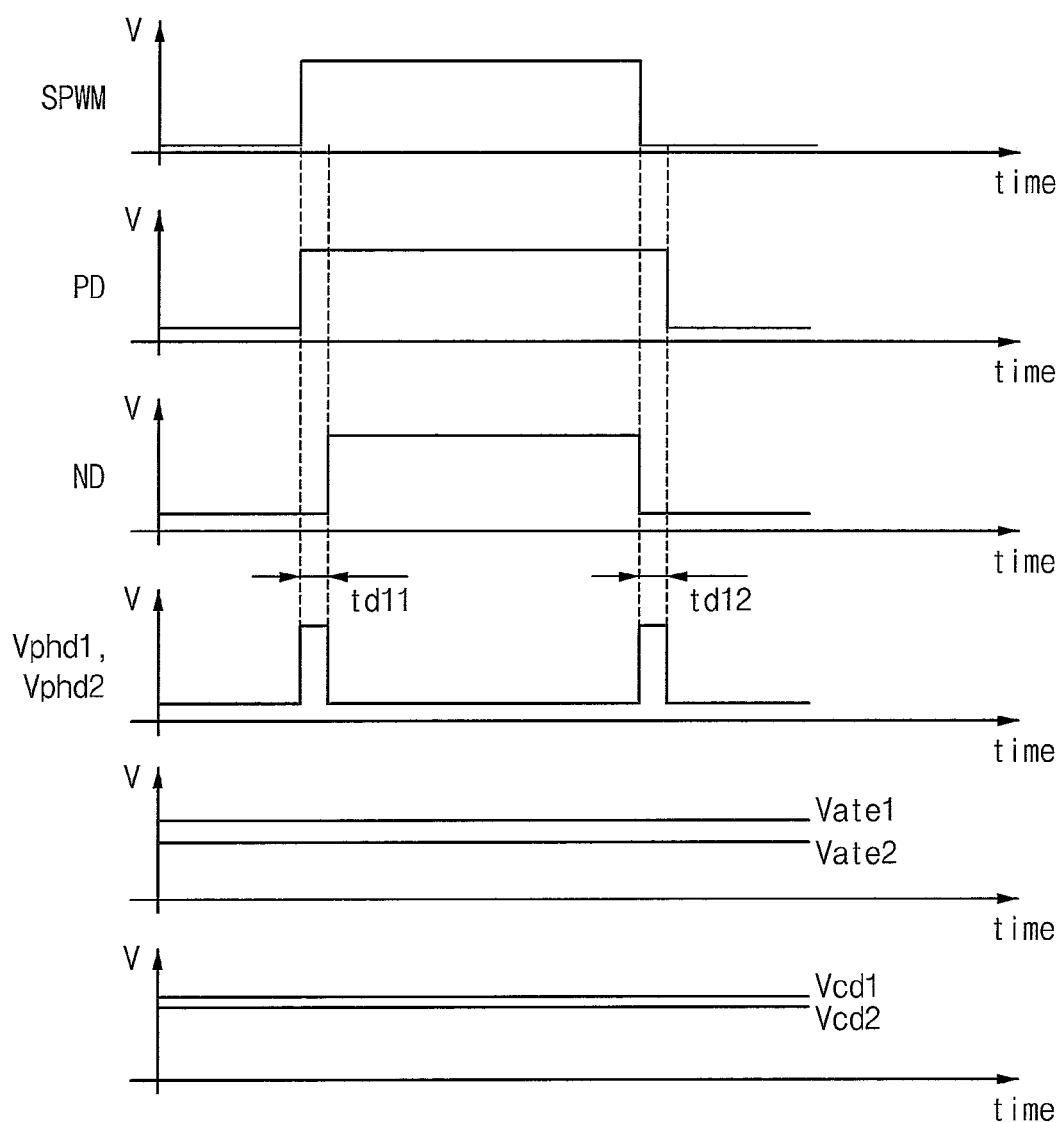
FIGS. 17 and 18 illustrate waveforms of various signals in the DC-DC converter of FIG. 1 when the dead time is not adjusted and when the dead time is adjusted, respectively, according to example embodiments.
Figure 18:
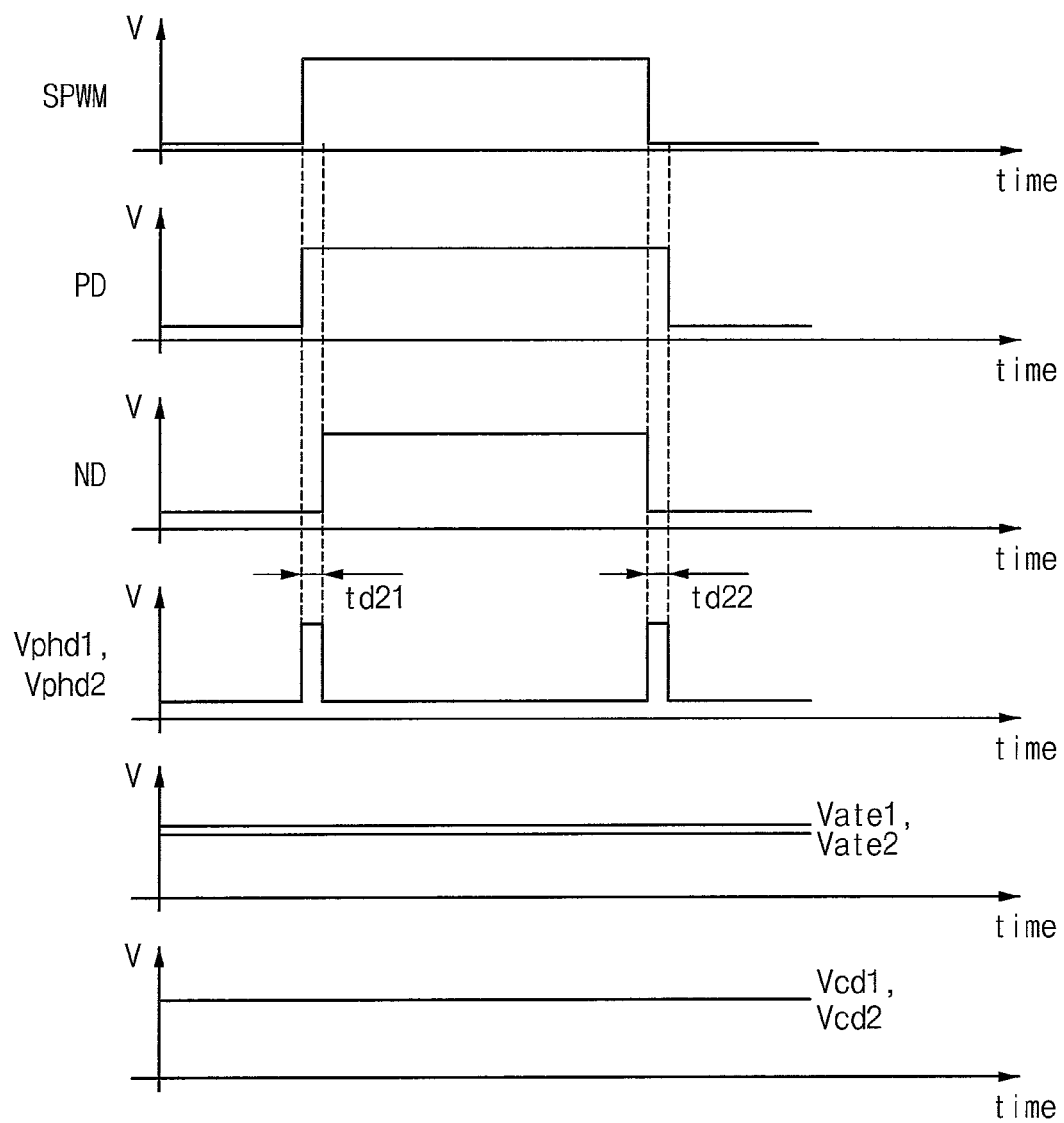

FIGS. 17 and 18 illustrate waveforms of various signals in the DC-DC converter of FIG. 1 when the dead time is not adjusted and when the dead time is adjusted, respectively, according to example embodiments.

Referring to FIGS. 1 through 3, 7 through 11 and 17, when the dead time is not adjusted in the DC-DC converter of FIG. 1, the first detection signal Vphd1 and the second detection signal Vphd2 corresponding to overlapped deactivation interval between the first driving control signal PD and the second driving control signal ND have durations corresponding to dead times td11 and td12.

In this case, each of the first amplified voltage signal Vate1 and the second amplified voltage signal Vate2 has a voltage level proportional to the duration of respective one of the dead times td11 and td12, and thus, each of the first voltage control signal Vcd1 and the second voltage control signal Vcd2 has a voltage level corresponding to a difference between a corresponding reference voltage and respective one of the first amplified voltage signal Vate1 and the second amplified voltage signal Vate2.

Referring to FIGS. 1 through 3, 7 through 11 and 18, when the dead time is adjusted in the DC-DC converter of FIG. 1, the first detection signal Vphd1 and the second detection signal Vphd2 corresponding to overlapped deactivation interval between the first driving control signal PD and the second driving control signal ND have durations corresponding to dead times td21 and td22.

In this case, each of the first amplified voltage signal Vate1 and the second amplified voltage signal Vate2 has a voltage level proportional to the duration of respective one of the dead times td21 and td22, and thus, each of the first voltage control signal Vcd1 and the second voltage control signal Vcd2 has a voltage level corresponding to a difference between a corresponding reference voltage and respective one of the first amplified voltage signal Vate1 and the second amplified voltage signal Vate2.

In FIG. 18, when assuming that the dead times td21 and td22 are adjusted to have the same target duration, a voltage level of the first amplified voltage signal Vate1 is substantially the same as a voltage level of the second amplified voltage signal Vate2 and thus, the first voltage control signal Vcd1 and the second voltage control signal Vcd2 may have the same voltage level.

In example embodiments, the dead times td21 and td22 may be adjusted to have different target durations. In this case, each of the first amplified voltage signal Vate1 and the second amplified voltage signal Vate2 has a voltage level proportional to the duration of respective one of the dead times td21 and td22, and thus, each of the first voltage control signal Vcd1 and the second voltage control signal Vcd2 has a different voltage level corresponding to a difference between a corresponding reference voltage and respective one of the first amplified voltage signal Vate1 and the second amplified voltage signal Vate2.

Therefore, the DC-DC converter 10 of FIG. 1 may adjust the dead time to have target duration without regard to various parameters including the process, the voltage and the temperature and thus the DC-DC converter 10 of FIG. 1 may enhance operation reliability.

Figure 19:
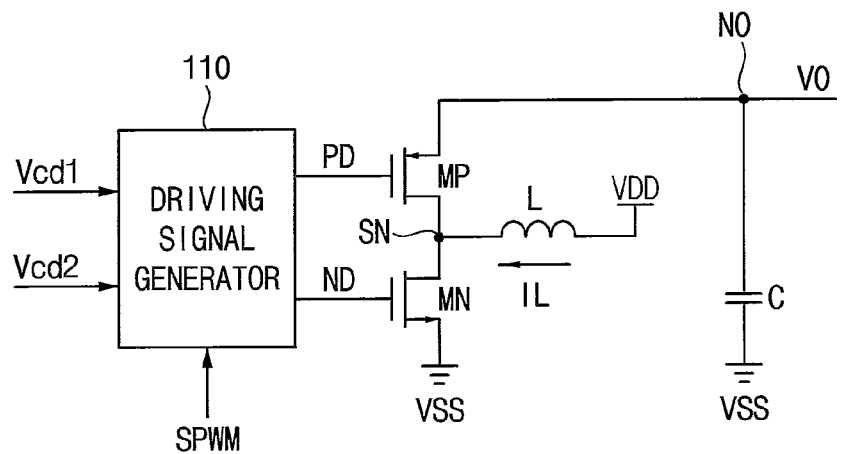
FIGS. 19 and 20 are diagrams illustrating example embodiments of a voltage converting circuit included in a DC-DC converter according to example embodiments.
Figure 20:
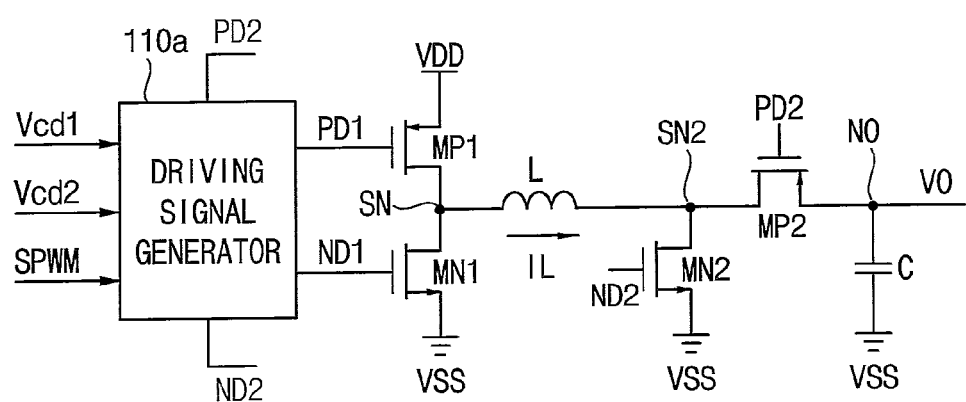

FIGS. 19 and 20 are diagrams illustrating example embodiments of a voltage converting circuit included in a DC-DC converter according to example embodiments. Hereinafter, descriptions repeated with the above descriptions may be omitted.

FIG. 19 illustrates a voltage converting circuit 100b corresponding to a boost converter. The connection of the power transistors MP and MN and the inductor L is different in the voltage converting circuit 100b in comparison with the voltage converting circuit 100a in FIG. 2.

Through the switching operation of the power transistors MP and MN, power may be supplied to the output node NO and the output voltage VO may be boosted to a higher voltage level than the power supply voltage VDD.

FIG. 20 illustrates a voltage converting circuit 100c corresponding to a buck-boost converter. In comparison with the voltage converting circuit 100a in FIG. 2 the voltage converting circuit 100c includes a driving signal generator 110a and further includes power transistors MP2 and MN2 in addition to the power transistors MP1 and MN1.

Through the switching operation of the power transistors MP1, MN1, MP2 and MN2, the voltage converting circuit 100c may generate the output voltage VO having a voltage level higher or lower than the power supply voltage VDD.

In FIG. 20, the inductor L is coupled between a first switching node SN1 and a second switching node SN2.

The first power transistor MP1 is connected between the power supply voltage VDD and the first switching node SN1 and has a gate to receive a first driving control signal PD1. The second power transistor MN1 is connected between the first switching node SN1 and the ground voltage VSS and has a gate to receive a second driving control signal ND1.

The third power transistor MP2 is connected between the second switching node SN2 and the output node NO and has a gate to receive a third driving control signal PD2. The fourth power transistor MN2 is connected between the second switching node SN2 and the ground voltage VSS and has a gate to receive a fourth driving control signal ND2. The driving signal generator 110a may generate the first to fourth driving control signals PD1, ND1, PD2, and ND2.

The operations of the boost converter and the buck-boost converter are well known to those skilled in the art and the detailed descriptions are omitted.

Figure 21:
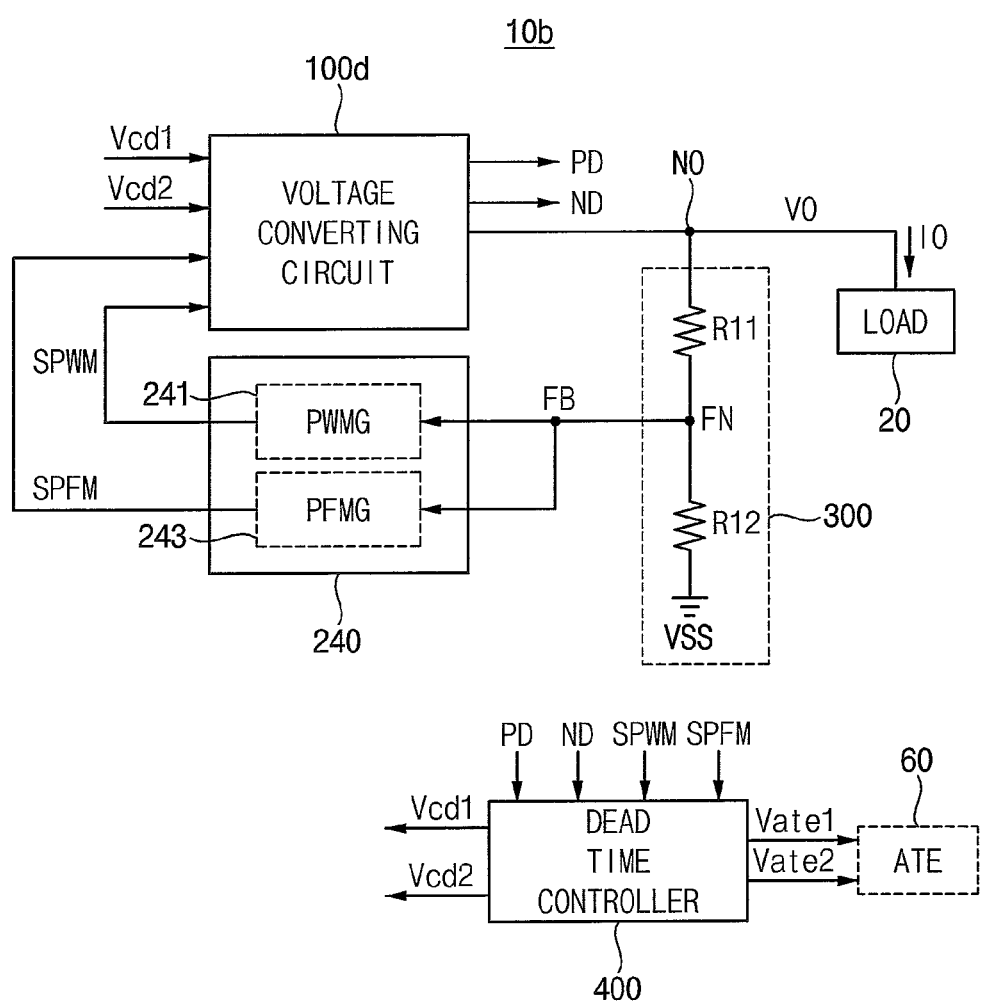
FIG. 21 is a block diagram illustrating an example of a DC-DC converter according to example embodiments.

FIG. 21 is a block diagram illustrating an example of a DC-DC converter according to example embodiments.

Referring to FIG. 21, a DC-DC converter 10b may include a voltage converting circuit 100d, a pulse signal generator 240, a feedback circuit 300 and a dead time controller 400. In FIG. 21, a load 20 coupled to an output node NO of the DC-DC converter 10b and an automated test equipment (ATE) 60 are also shown for convenience of explanation.

The DC-DC converter 10b of FIG. 21 differs from the DC-DC converter 10 of FIG. 1 in the pulse signal generator 240 and description on the pulse signal generator 240 will be provided. Description repeated with FIG. 1 will be omitted.

The pulse signal generator 240 may include a PWM signal generator PWMG 241 and a pulse-frequency modulation (PFM) signal generator PFMG 243.

The PWM signal generator 241 may perform a PWM on the feedback voltage FB having a voltage level proportional to the output voltage VO to generate a PWM signal SPWM. The PFM signal generator 243 may perform a PFM on the feedback voltage FB having a voltage level proportional to the output voltage VO to generate a PFM signal SPFM.

The voltage converting circuit 100d, in a PWM mode, may generate the output voltage VO at the output node NO by converting the power supply voltage VDD based on the PWM signal SPWM and may generate the first driving control signal PD and the second driving control signal ND which drive power transistors in the voltage converting circuit 100d while adjusting a dead time between the first driving control signal PD and the second driving control signal ND based on the voltage control signals Vcd1 and Vcd2.

The voltage converting circuit 100d, in a PFM mode, may generate the output voltage VO at the output node NO by converting the power supply voltage VDD based on the PFM signal SPFM and may generate the first driving control signal PD and the second driving control signal ND which drive power transistors in the voltage converting circuit 100d while adjusting a dead time between the first driving control signal PD and the second driving control signal ND based on the voltage control signals Vcd1 and Vcd2.

The dead time controller 400 of FIG. 21 may receive the PWM signal SPWM, the PFM signal SPFM, the first driving control signal PD and the second driving control signal ND, may generate at least one of control voltage signals Vcd1 and Vcd2 associated with adjusting a dead time corresponding to an overlapped deactivation interval between the first driving control signal PD and the second driving control signal ND and may generate at least one of amplified voltage signals Vate1 and Vate2 which has a voltage level proportional to the dead time, based on the first driving control signal PD and the second driving control signal ND.

Figure 22:
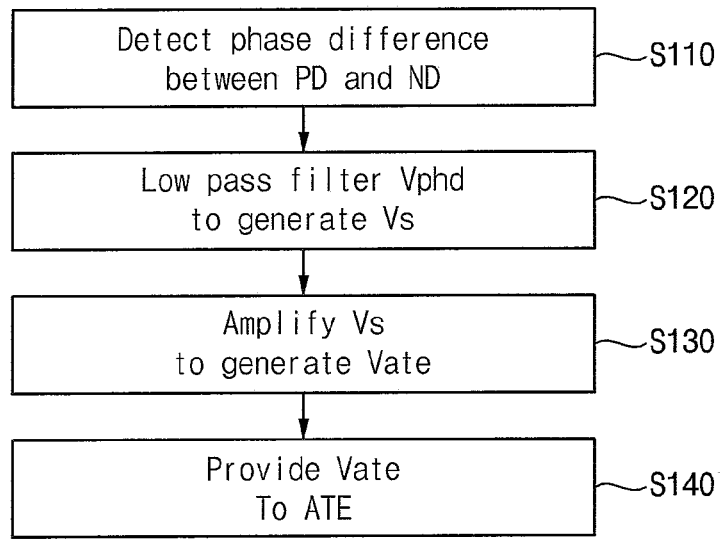
FIG. 22 is a flow chart illustrating a method of operating a dead time controller according to example embodiments.

FIG. 22 is a flow chart illustrating a method of operating a dead time controller according to example embodiments.

Referring to FIGS. 7 through 13 and 22, in the detection mode, the phase detector 410 may detect a phase difference between the first driving control signal PD the second driving control signal ND to generate at least one of the detection signals Vphd1 and Vphd2 (operation S110).

The first circuit 420 performs low-pass filtering on the at least one detections signal Vphd to generate at least one DC voltage signal Vs (operation S120).

The amplifying circuit 440 amplify the at least one DC voltage signal Vs to generate at least one amplified voltage signal Vate (operation S130).

The amplifying circuit 440, in the detection mode provides the at least one amplified voltage signal Vate to the ATE 60 (operation S140). The ATE 60 measures the dead time between the first driving control signal PD and the second driving control signal ND based on the at least one amplified voltage signal Vate.

Figure 23:
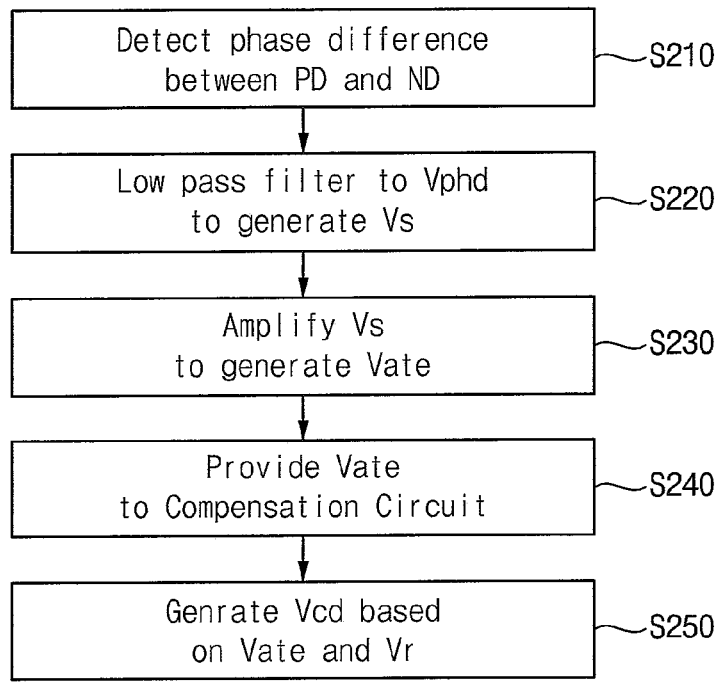
FIG. 23 is a flow chart illustrating a method of operating a dead time controller according to example embodiments.

FIG. 23 is a flow chart illustrating a method of operating a dead time controller according to example embodiments.

Referring to FIGS. 7 through 11, 14, 15 and 22, in the adjusting mode, the phase detector 410 may detect a phase difference between the first driving control signal PD the second driving control signal ND to generate at least one of the detection signals Vphd1 and Vphd2 (operation S210).

The first circuit 420 performs low-pass filtering on the at least one detections signal Vphd to generate at least one DC voltage signal Vs (operation S220).

The amplifying circuit 440 amplify the at least one DC voltage signal Vs to generate at least one amplified voltage signal Vate (operation S230).

The amplifying circuit 440, in the adjusting mode provides the at least one amplified voltage signal Vate to the compensation circuit (operation S240).

The compensation circuit 470 generates at least one voltage control signal Vcd based on the at least one amplified voltage signal Vate and a reference voltage Vr (operation S250) and provides the at least one voltage control signal Vcd to the driving signal generator 110. The compensation circuit 470 adjusts a level of the reference voltage Vr by adjusting a ratio of resistance values of resistors in the compensation circuit 470 such that dead time between the first driving control signal PD and the second driving control signal ND is adjusted.

Figure 24:
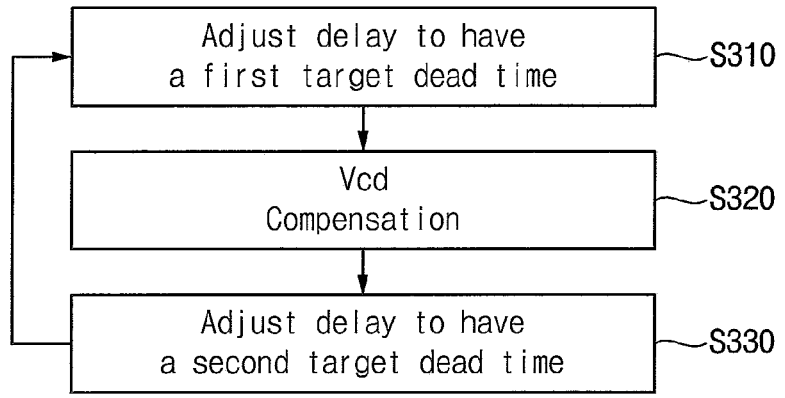
FIG. 24 is a flow chart illustrating a method of adjusting duration of a dead time in a dead time controller according to example embodiments.

FIG. 24 is a flow chart illustrating a method of adjusting duration of a dead time in a dead time controller according to example embodiments.

Referring to FIGS. 14, 15 and 24, the dead time controller 400 adjusts a delay amount of at least one of the delay cells 117 and 118 such that dead time between the first driving control signal PD and the second driving control signal ND has a first target dead time (operation S310).

The compensation circuit 470 adjusts the at least one voltage control signal Vcd (operation S320).

The compensation circuit 470 applies the at least one voltage control signal Vcd which is adjusted to at least one of the delay cells 117 and 118 to adjust a delay amount of at least one of the delay cells 117 and 118 such that dead time between the first driving control signal PD and the second driving control signal ND has a second target dead time (operation S330). The second target dead time may be smaller than the first target dead time. The process returns to the operation S310.

Figure 25:
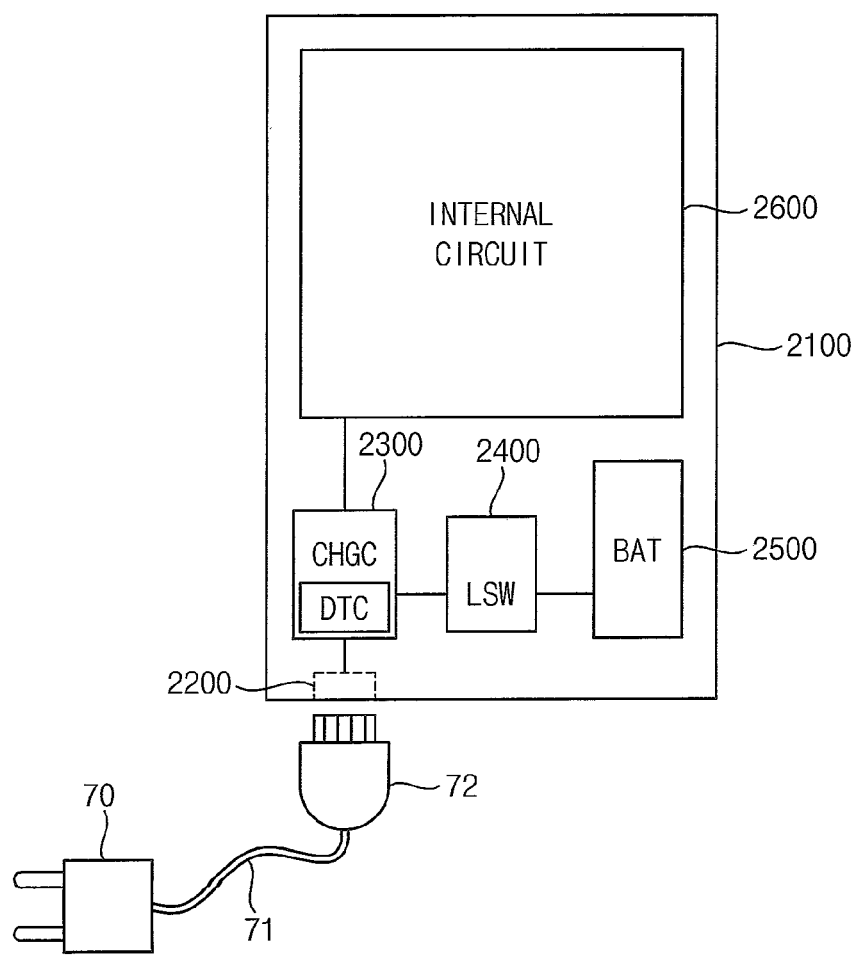
FIGS. 25 and 26 are diagrams illustrating a system including a dead time controller according to example embodiments.
Figure 26:
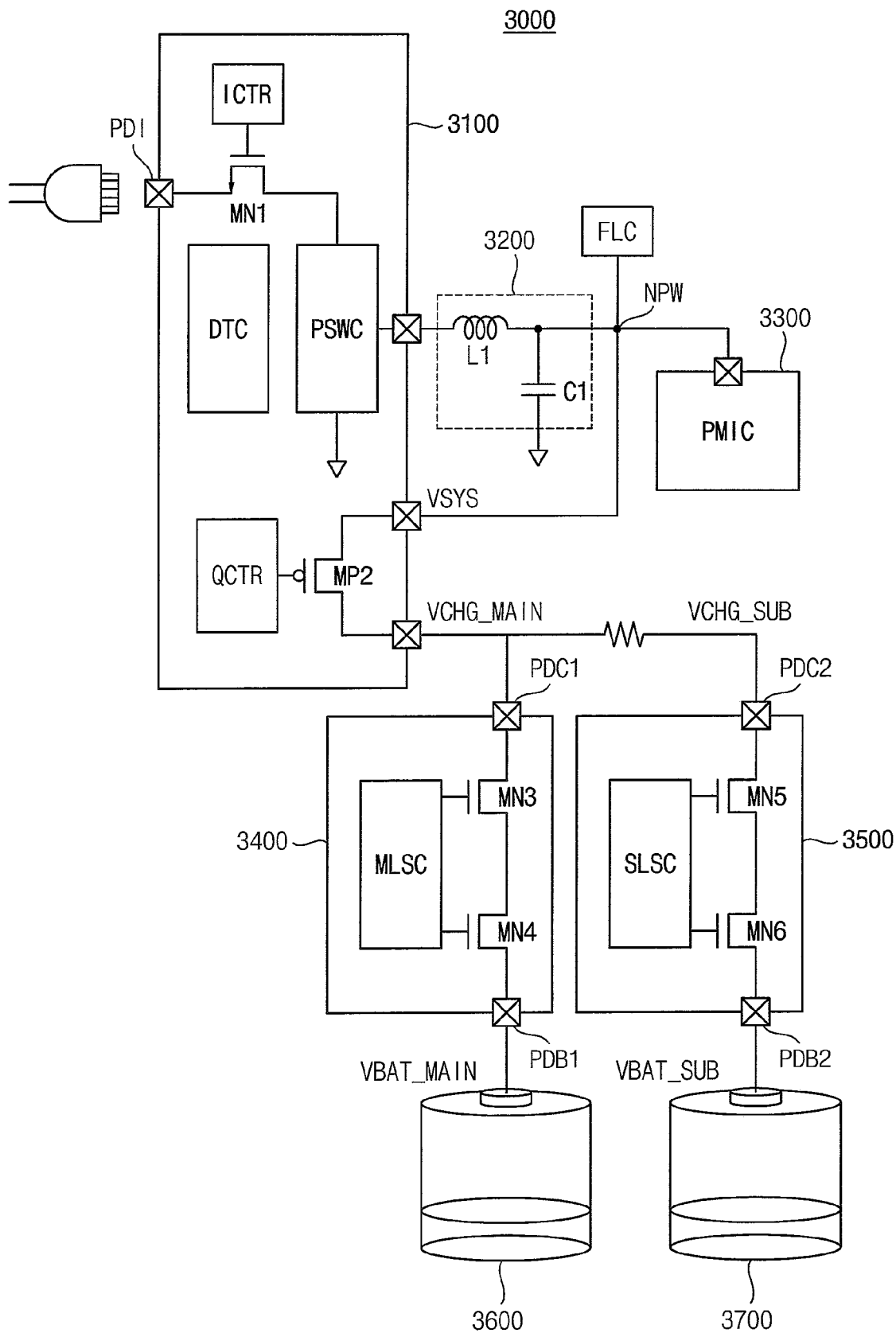

FIGS. 25 and 26 are diagrams illustrating a system including a dead time controller according to example embodiments.

Referring to FIG. 25, a system 2000 may include a mobile device 2100 such as a smartphone and an AC-DC wall adaptor or a travel adaptor 70 to supply power to the mobile device 2100. The travel adaptor 70 may be connected to a connector 2200 of the mobile device 2100 through a cable 71 and a jack 72 to supply power to the mobile device 2100.

The mobile device 2100 may include a charging control circuit CHGC 2300, a load switch circuit LSW 2400, a battery BAT 2500 and an internal circuit 2600.

The charging control circuit 2300 may change the DC voltage from the travel adaptor 70 to provide charging power to the battery 2500 and/or operating power to the internal circuit 2600. When the travel adaptor 70 is removed, the charged power in the battery may be provided to the internal circuit 2600.

The charging control circuit 2300 may include a dead time controller DTC according to example embodiments as described above to adaptively adjust a dead time between a first driving control signal and a second driving control signal applied to power switches in the charging control circuit 2300.

Referring to FIG. 26, an electronic device or an electronic system 3000 may include a charging control circuit CHGC, a power management integrated circuit PMIC 3300, a main load switch circuit 3400, a sub load switch circuit 3500, a main battery 3600 and a sub battery 3700.

The charging control circuit may include a voltage converter 3100 and a low pass filter 3200. For example, the charging control circuit in FIG. 26 may correspond to the DC-DC converter 10 in FIG. 1, the DC-DC converter 10b in FIG. 21, or the charging control circuit CHGC 2300 in FIG. 25.

The voltage converter 3100 may include a power switching circuit PSWC, transistors MN1 and MP2 and controllers ICTR and QCTR to control the transistors MN1 and MP2 and the power switching circuit PSWC. The voltage converter 3100 may include dead time controller DTC according to example embodiments as described above. The dead time controller DTC may adaptively adjust dead time between driving control signals applied to the transistors MN1 and MP2.

The low pass filter 3200 may be implemented with a combination of an inductor L1 and a capacitor C1, and so on. The power switching circuit PSWC may perform a complementary switching operation and/or a self-balancing operation to compensate for effects due to mismatch.

The voltage converter 3100 may receive power from the travel adaptor through the input pad PDI and provide operating power through a power node NPW to the internal circuits such as the power management integrated circuit 3300. The power node NPW may correspond to the above-described output node NO, and the voltage VSYS on the power node NPW may correspond to the above-described output voltage VO.

In addition, the voltage converter 3100 may provide charging power to the main battery 3600 and the sub battery 3700.

The main load switch circuit 3400 may be connected to the voltage converter 3100 through a first charging pad PDC1 to which a main charging voltage VCHG_MAIN is applied and connected to the main battery 3600 through a first battery pad PDB1 to which a main battery voltage VBAT_MAIN is applied.

The sub load switch circuit 3500 may be connected to the voltage converter 3100 through a second charging pad PDC2 to which a sub charging voltage VCHG_SUB is applied and connected to the sub battery 3700 through a second battery pad PDB2 to which a sub battery voltage VBAT_SUB is applied. The main charging voltage VCHG_MAIN and the sub charging voltage VCHG_SUB may be different due to the parasitic resistance along the intermediate path.

The main load switch circuit 3400 may include a main charging transistor MN4, a main discharging transistor MN3 and a main load switch controller MLSC. The sub load switch circuit 3500 may include a sub charging transistor MN6, a sub discharging transistor MN5 and a sub load switch controller SLSC. Each of the main load switch controller MLSC and the sub load switch controller SLSC may be configured to selectively operate in the voltage control mode or current control mode based on the magnitude of the charging current and/or the discharging current as described above.

As described above, the dead time controller and the DC-DC converter including the dead time controller according to example embodiments, may measure dead time by converting the dead time between driving control signals applied to power transistors therein to a voltage signal. Therefore, the dead time controller and the DC-DC converter may easily detect the dead time and may adaptively adjust the dead time based on the voltage signal. Accordingly, a device and a system including the DC-DC converter may have enhanced operation reliability.

The present disclosure may be applied to any electronic devices and systems requiring voltage conversion. For example, the present disclosure may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. A dead time controller in a direct current (DC)-DC converter, the dead time controller comprising:
 a phase detector configured to generate a detection signal by detecting a phase difference between a first driving control signal applied to a first power transistor configured to pull-up a switching node coupled to a first terminal of an inductor included in the DC-DC converter and a second driving control signal applied to a second power transistor configured to pull-down the switching node, the detection signal being associated with a dead time corresponding to an overlapped deactivation interval between the first driving control signal and the second driving control signal;
 a filter circuit configured to generate a DC voltage signal by filtering and averaging the detection signal based on a pulse-width modulation (PWM) signal, the PWM signal being generated by performing a PWM on a feedback voltage generated from an output voltage provided at an output node coupled to a second terminal of the inductor; and
 an amplifying circuit configured to generate an amplified voltage signal having a voltage level proportional to the dead time by amplifying the DC voltage signal,
 wherein the feedback voltage is different from the output voltage,
 wherein the detection signal is a first detection signal corresponding to a first dead time associated with a rising edge of the PWM signal,
 wherein the phase detector is configured to further generate a second detection signal corresponding to a second dead time associated with a falling edge of the PWM signal,
 wherein the phase detector includes:
 a first exclusive OR gate configured to perform an exclusive OR operation on the first driving control signal and the second driving control signal to output the first detection signal; and
 a second exclusive OR gate configured to perform an exclusive OR operation on the first driving control signal and the second driving control signal to output the second detection signal,
 wherein the DC voltage signal is a first DC voltage signal,
 wherein the filter circuit is configured to further generate a second DC voltage signal, and
 wherein the filter circuit includes:
 a first filter configured to provide the first DC voltage signal at a first node by performing a first AND operation on the first detection signal and the PWM signal and performing low-pass filtering on a result of the first AND operation;
 an inverter configured to invert the PWM signal; and
 a second tilter configured to provide the second DC voltage signal at a second node by performing a second AND operation on the second detection signal and an output of the inverter and performing low-pass filtering on a result of the second AND operation.

2. The dead time controller of claim 1, wherein the first filter includes:
 a first AND gate configured to perform the first AND operation;
 a first filter resistor connected between an output of the first AND gate and the first node; and
 a first filter capacitor coupled between the first node and a ground voltage, and
 wherein the second filter includes:
 a second AND gate configured to perform the second AND operation;
 a second filter resistor coupled between an output of the second AND gate and the second node; and
 a second filter capacitor coupled between the second node and the ground voltage.

3. The dead time controller of claim 1, wherein the amplified voltage signal is a first amplified voltage signal,
 wherein the amplifying circuit is configured to further generate a second amplified voltage signal, and
 wherein the amplifying circuit includes:
 a first amplifier configured to output the first amplified voltage signal at a third node by amplifying a voltage difference between the first DC voltage signal and a first feedback voltage;
 a first feedback circuit coupled between the third node and a ground voltage, and configured to provide the first feedback voltage at a fourth node by dividing the first amplified voltage signal;
 a second amplifier configured to output the second amplified voltage signal at a fifth node by amplifying a voltage difference between the second DC voltage signal and a second feedback voltage; and
 a second feedback circuit coupled between the fifth node and the ground voltage, and configured to provide the second feedback voltage at a sixth node by dividing the second amplified voltage signal.

4. The dead time controller of claim 3,
 wherein the first amplifier includes a positive input terminal configured to receive the first DC voltage signal, a negative input terminal coupled to the fourth node and configured to receive the first feedback voltage and an output terminal coupled to the third node, and
 wherein the second amplifier includes a positive input terminal configured to receive the second DC voltage signal, a negative input terminal coupled to the sixth node and configured to receive the second feedback voltage and an output terminal coupled to the fifth node.

5. The dead time controller of claim 3,
wherein the first feedback circuit includes a first resistor connected between the fourth node and the ground voltage and a second resistor connected between the third node and the fourth node, and
wherein the second feedback circuit includes a third resistor connected between the sixth node and the ground voltage and a fourth resistor connected between the fifth node and the sixth node.

6. The dead time controller of claim 1, further comprising:
a compensation circuit configured to generate a control voltage signal associated with controlling a duration of the dead time, based on the amplified voltage signal and a reference voltage.

7. The dead time controller of claim 6,
wherein the amplified voltage signal is a first amplified voltage signal corresponding to a first dead time associated with a rising edge of the PWM signal,
wherein the amplifying circuit is configured to further generate a second amplified voltage signal corresponding to a second dead time associated with a falling edge of the PWM signal,
wherein the control voltage signal is a first control voltage signal,
wherein the compensation circuit is configured to further generate a second control voltage signal, and
wherein the compensation circuit includes:
a first amplifier configured to output the first control voltage signal associated with controlling a duration of the first dead time by amplifying a voltage difference between a first reference voltage and the first amplified voltage signal; and
a second amplifier configured to output the second control voltage signal associated with controlling duration of the second dead time by amplifying a voltage difference between a second reference voltage and the second amplified voltage signal.

8. The dead time controller of claim 7,
wherein the first amplifier includes a positive input terminal configured to receive the first reference voltage, a negative input terminal configured to receive the first amplified voltage signal and an output terminal configured to provide the first control voltage signal,
wherein the second amplifier includes a positive input terminal configured to receive the second reference voltage, a negative input terminal configured to receive the second amplified voltage signal and an output terminal configured to provide the second control voltage signal, and
wherein the compensation circuit further includes:
a first compensation capacitor coupled between the negative input terminal of the first amplifier and the output terminal of the first amplifier; and
a second compensation capacitor coupled between the negative input terminal of the second amplifier and the output terminal of the second amplifier.

9. The dead time controller of claim 7, further comprising:
an adaptive reference voltage generator configured to generate the first reference voltage and the second reference voltage and configured to provide the first reference voltage and the second reference voltage to the first amplifier and the second amplifier, respectively.

10. The dead time controller of claim 9, wherein the adaptive reference voltage generator includes a plurality of dividing resistors and the adaptive reference voltage generator is configured to adjust the dead time by using ratio of the plurality of dividing resistors.

11. A direct current (DC)-DC converter comprising:
a voltage converting circuit configured to generate:
an output voltage at an output node by converting a power supply voltage based on a control voltage signal and a pulse-width modulation (PWM) signal,
a first driving control signal applied to a first power transistor configured to pull-up a switching node coupled to a first terminal of an inductor included in the DC-DC converter, and
a second driving control signal applied to a second power transistor configured to pull-down the switching node;
a PWM signal generator configured to generate the PWM signal based on a feedback voltage having a voltage level proportional to a voltage level of the output voltage; and
a dead time controller configured to generate the control voltage signal and an amplified voltage signal based on the first driving control signal and the second driving control signal, wherein the control voltage signal is associated with adjusting a dead time corresponding to an overlapped deactivation interval between the first driving control signal and the second driving control signal,
wherein the amplified voltage signal has a voltage level proportional to the dead time, and
wherein the voltage level of the feedback voltage is different from the voltage level of the output voltage, and
wherein the dead time controller includes:
a phase detector configured to generate a detection signal corresponding the dead time by detecting a phase difference between the first driving control signal and the second driving control signal;
a filter circuit configured to generate a DC voltage signal based on the PWM signal by filtering and averaging the detection signal;
an amplifying circuit configured to generate the amplified voltage signal having a voltage level proportional to the dead time by amplifying the DC voltage signal; and
a compensation circuit configured to generate the control voltage signal associated with controlling a duration of the dead time, based on the amplified voltage signal and a reference voltage,
wherein, in a detection mode, the amplifying circuit is configured to provide the amplified voltage signal to an external automated test equipment (ATE) to detect the dead time, and
wherein, in an adjusting mode, the amplifying circuit is configured to provide the amplified voltage signal to the compensation circuit and the compensation circuit is configured to adjust the control voltage signal such that the amplified voltage signal follows a reference voltage.

12. The DC-DC converter of claim 11,
wherein the control voltage signal is a first control voltage signal,
wherein the amplified voltage signal is a first amplified voltage signal corresponding to a first dead time associated with a rising edge of the PWM signal,
wherein the dead time controller is configured to further generate a second control voltage signal and a second amplified voltage signal corresponding to a second dead time associated with a falling edge of the PWM signal, and wherein the voltage converting circuit includes:
a driving signal generator configured to generate the first driving control signal and the second driving control signal, adjust a delay amount of the first driving control signal based on the first control voltage signal and adjust a delay amount of the second driving control signal based on the second control voltage signal;
the first power transistor connected between the power supply voltage and the switching node;
the second power transistor connected between the switching node and a ground voltage;
the inductor coupled between the switching node and the output node; and
a capacitor coupled between the output node and the ground voltage, the capacitor being charged with the output voltage.

13. The DC-DC converter of claim 12, wherein the driving signal generator includes:
a first delay cell configured to delay an inverted version of the first driving control signal;
a second delay cell configured to delay the second driving control signal;
an OR gate configured to perform an OR operation on the PWM signal and an output of the second delay cell;
a first buffer configured to output the first driving control signal by buffering an output of the OR gate;
a NOR gate configured to perform NOR operation on an inverted version of the PWM signal and an output of the first delay cell; and
a second buffer configured to output the second driving control signal by buffering an output of the NOR gate.

14. The DC-DC converter of claim 11,
wherein the detection signal is a first detection signal corresponding to a first dead time associated with a rising edge of the PWM signal,
wherein the phase detector is configured to further generate a second detection signal corresponding to a second dead time associated with a falling edge of the PWM signal, and
wherein the filter circuit includes:
a first filter configured to provide a first DC voltage signal at a first node by performing a first AND operation on the first detection signal and the PWM signal and performing low-pass filtering on a result of the first AND operation;
an inverter configured to invert the PWM signal; and
a second filter configured to provide a second DC voltage signal at a second node by performing a second AND operation on the second detection signal and an output of the inverter and performing low-pass filter a result of the second AND operation.

15. The DC-DC converter of claim 14,
wherein the amplified voltage signal is a first amplified voltage signal,
wherein the dead time controller is configured to further generate a second amplified voltage signal,
wherein the amplifying circuit includes:
a first amplifier configured to output the first amplified voltage signal at a third node by amplifying a voltage difference between the first DC voltage signal and a first feedback voltage to;
a first feedback circuit coupled between the third node and a ground voltage, and configured to provide the first feedback voltage at a fourth node by dividing the first amplified voltage signal;
a second amplifier configured to output the second amplified voltage signal at a fifth node by amplifying a voltage difference between the second DC voltage signal and a second feedback voltage; and
a second feedback circuit coupled between the fifth node and the ground voltage, and configured to provide the second feedback voltage at a sixth node by dividing the second amplified voltage signal,
wherein the control voltage signal is a first control voltage signal,
wherein the compensation circuit is configured to further generate a second control voltage signal, and
wherein the compensation circuit includes:
a third amplifier configured to output the first control voltage signal associated with controlling a duration of the first dead time by comparing a first reference voltage and the first amplified voltage signal; and
a fourth amplifier configured to the second control voltage signal associated with controlling a duration of the second dead time by comparing a second reference voltage and the second amplified voltage signal.

16. A dead time controller in a direct current (DC)-DC converter, the dead time controller comprising:
a phase detector configured to generate a detection signal by detecting a phase difference between a first driving control signal applied to a first power transistor configured to pull-up a switching node coupled to a first terminal of an inductor included in the DC-DC converter and a second driving control signal applied to the first power transistor configured to pull-down the switching node, the detection signal being associated with a dead time corresponding to an overlapped deactivation interval between the first driving control signal and the second driving control signal;
a filter circuit configured to generate a DC voltage signal by filtering and averaging the detection signal based on a pulse-width modulation (PWM) signal, the PWM signal being generated by performing a PWM on a feedback voltage generated from an output voltage provided at an output node coupled to a second terminal of the inductor;
an amplifying circuit configured to an amplified voltage signal having a voltage level proportional to the dead time by amplifying the DC voltage signal; and
a compensation circuit configured to generate a control voltage signal associated with controlling a duration of the dead time, based on the amplified voltage signal and a reference voltage,
wherein the compensation circuit is configured to adjust the control voltage signal such that the amplified voltage signal follows a reference voltage,
wherein the feedback voltage is different from the output voltage,
wherein the amplified voltage signal is a first amplified voltage signal corresponding to a first dead time associated with a rising edge of the PWM signal,
wherein the amplifying circuit is configured to further generate a second amplified voltage signal corresponding to a second dead time associated with a falling edge of the PWM signal,
wherein the control voltage signal is a first control voltage signal,
wherein the compensation circuit is configured to further generate a second control voltage signal, and
wherein the compensation circuit includes:
a first amplifier configured to output the first control voltage signal associated with controlling a duration the first dead time by amplifying a voltage difference between a first reference voltage and the first amplified voltage signal; and a second amplifier configured to output the second control voltage signal associated with controlling duration of the second dead time by amplifying a voltage difference between a second reference voltage and the second amplified voltage signal.

* * * * *